(12) United States Patent
Landvater

(10) Patent No.: US 7,552,066 B1
(45) Date of Patent: Jun. 23, 2009

(54) METHOD AND SYSTEM FOR RETAIL STORE SUPPLY CHAIN SALES FORECASTING AND REPLENISHMENT SHIPMENT DETERMINATION

(75) Inventor: Darryl V. Landvater, Williston, VT (US)

(73) Assignee: The Retail Pipeline Integration Group, Inc., Essex Junction, VT (US)

(*) Notice: Subject to any disclaimer, the term of this patent is extended or adjusted under 35 U.S.C. 154(b) by 941 days.

(21) Appl. No.: 09/899,593

(22) Filed: Jul. 5, 2001

(51) Int. Cl.
*G06F 17/30* (2006.01)
(52) U.S. Cl. ........................................ 705/10
(58) Field of Classification Search .................... 705/10
See application file for complete search history.

(56) References Cited

U.S. PATENT DOCUMENTS

| | | | | |
|---|---|---|---|---|
| 5,128,861 | A | 7/1992 | Kagami | 705/10 |
| 5,168,445 | A | 12/1992 | Kawashima et al. | 364/403 |
| 5,299,115 | A | 3/1994 | Fields et al. | 705/10 |
| 5,450,317 | A * | 9/1995 | Lu et al. | 705/10 |
| 5,459,656 | A | 10/1995 | Fields et al. | 705/7 |
| 5,659,593 | A * | 8/1997 | Tzvieli | 379/13 |
| 5,712,985 | A * | 1/1998 | Lee et al. | 705/10 |
| 5,819,232 | A * | 10/1998 | Shipman | 705/8 |
| 5,832,532 | A | 11/1998 | Kennedy et al. | 707/503 |
| 5,845,258 | A | 12/1998 | Kennedy | 705/8 |
| 5,953,707 | A * | 9/1999 | Huang et al. | 705/10 |
| 6,006,196 | A * | 12/1999 | Feigin et al. | 705/10 |
| 6,032,125 | A | 2/2000 | Ando | 705/10 |
| 6,205,431 | B1 * | 3/2001 | Willemain et al. | 705/10 |
| 6,341,269 | B1 | 1/2002 | Dulaney et al. | 705/22 |
| 6,415,195 | B1 * | 7/2002 | Gleditsch et al. | 700/99 |
| 6,609,101 | B1 * | 8/2003 | Landvater | 705/10 |
| 7,155,402 | B1 * | 12/2006 | Dvorak | 705/10 |
| 7,225,140 | B2 * | 5/2007 | Yanagino et al. | 705/10 |

(Continued)

FOREIGN PATENT DOCUMENTS

JP 7175787 A 7/1995

(Continued)

OTHER PUBLICATIONS

Zellner, Time-series analysis, forecasting, and econometric modelling, Journal of Forecasting, Mar. 1994, v.13, n.2, p. 215 (19 pages).*

(Continued)

*Primary Examiner*—Scott L Jarrett
(74) *Attorney, Agent, or Firm*—Downs Rachlin Martin PLLC

(57) ABSTRACT

A time-phased forecasting and replenishment system (20) for a retail supply chain for inventory management, financial management, capacity planning and transportation planning. A computer(s) (28) create time-phased plans for one or more retail facilities, such as various types of retail stores (23) and/or various types of suppliers (24). The system calculates projected sales for each product at each facility and calculates projected replenishment shipments between facilities and suppliers a specified number of weeks into the future. The calculated forecasts and replenishments are done in ways that account for the unique needs of retail organizations, and allow efficient processing and storage of the large data volumes typical in many retail organizations. In particular the system has specified logic for handling low-volume products, and has a transportation and capacity planning component that benefits retail stores. Also, the system is designed to operate on a continuous basis if desired.

33 Claims, 17 Drawing Sheets

U.S. PATENT DOCUMENTS

2002/0188499 A1* 12/2002 Jenkins et al. ............... 705/10

FOREIGN PATENT DOCUMENTS

JP             7239884 A      9/1995

OTHER PUBLICATIONS

Metters, General rules for production planning with seasonal demand, International Journal of Production Resources, 1998, v.36, n.5, p. 1387 (13 pages).*

Buxey, Production planning and scheduling for seasonal demand, International Journal of Operations and Production management, 1993, v.13, n.7, p. 4, [online], retrieved Nov. 8, 2005 via PROQUEST ID:1122471.*

Inman, The causes of schedule instability in an automotive supply chain, Production and Inventory Management Journal, 2QTR1997, v.38, n.2, p. 26 (6 pages).*

Mentzer, Benchmarking sales forecasting management, Business Horizons, May/Jun. 1999, v.42, n.3, p. 48 (9 pages).*

Moon, Seven keys to better forecasting, Business Horizons, Sep./Oct. 1998, v.41, n.5, pp. 44 (9 pages).*

Croston, J.D., Forecasting and Stock Control for Intermittent Demand Operational Research Quaterly, vol. 23, No. 3, Sep. 1972, pp. 289-303.*

Blackstone, John H. et al., Inventory Management Techniques Journal of Small Business Management, vol. 23, No. 2 Apr. 1985, pp. 27-33.*

Schultz, Carl R., Forecasting and Inventory Control for Sporadic Demand under Periodic Review The Journal of the Operations Research Society, vol. 38, No. 5, May 1987, pp. 453-458.*

Chauduri, Mailereyee Deb, A Note on the Heuristic for Replenishment of Trended Inventories Considering Shortages The Journal of the Operations Research Society, vol. 38, No. 5, May 1987, pp. 459-463.*

Schultz, Charles, Replenishment Delays for Expensive for Slow-Moving Items Management Sciences, vol. 35, No. 12, Dec. 1989, pp. 1454-1462.*

Gary, Micheasl, Efficient replenishment: The key to ECR Progressive Grocer, vol. 72, No. 2, Dec. 1993, pp. 5-8.*

Purpura, Linda, Forecast Views: Retailers and Vendors are Starting to Collaborate to Take the Guesswork Out of Ordering By Refining Planning Methods, Supermarket News, Vo. 48, No. 23, Jun. 8, 1998.*

Effective Inventory Management Starts at the Store Drug Store News, vol. 20, No. 12, Aug. 3, 1998.*

Smart, Charles, Bootstrap Your Way to Better Forecasts Midrange Enterprise, Jan. 2001, pp. 18-21.*

Chauch, Ben A., Stock Levels and Delivery Rates in Vendor Managed Inventory Programs Production and Operations Mangement, vol. 10, No. 1, Spring 2001.*

Martin, Andre J., Capacity Planning; the antedote to supply chain constraints Supply Chain Management Review, vol. 5, No. 6, Nov. 2001.*

Thomas, L.C. et al. An Algorithm For Limited Capacity Inventory Problem with Staggering Journal of Operational Research Society, vol. 34, 1983, pp. 81-85.*

Williams, William et al., Time-dependent demand in requirements planning: An exploratory assessment of the effects fo serially correlated demand sequences on lot-sizing performance, Journal of Operations Management, vol. 6, No. 1 , Nov. 1985, Abstract.*

Gallego, Guillermo, The complexity of the staggering problem, and other classical inventory problems Operations Research Letters, vol. 12, No. 1, Jul. 1992, Abstract.*

Masters, James M., Determination of Near Optimal Stock Levels For Multi-Echelon Distribution Inventories Journal of Business Logistics, vol. 14, No. 2, 1993, pp. 165-195.*

Razi, Muhammand Abdullah-Al, Periodic review inventory control model for slow moving parts Virginia Commonwealth University, 1999, AAT 9936703, Abstract.*

Chen, Fangruo et al., A Staggered Ordering Policy For One-Warehouse Multiretailer Systems Operations Research, Informs, vol. 48, No. 2, Mar./Apr. 2000, pp. 281-293.*

Favaretto, Daniela et al., Discrete frequency models for inventory management—an introduction International Journal of Production Economics, vol. 71, 2001, pp. 331-342.* van Ryzin, Garrett J., Analyzing Inventory Cost and Service in Supply Chains Columbia Business School, Apr. 2001.*

Martin, Andre J., Distribution Resouce Planning: The Gateway to True Quick Response and Continual Replenishment John Wiley & Sons, 1995, ISBN 0-471-13222-5.*

Lowson, Bob et al., Quick Response; Managing the Supply Chain to Meet Consumer Demand John Wiley & Sons, 1999, ISBN: 0-471-98833-2.*

Maskell, Brian H., Distribution Resource Planning Management Accounting, vol. 66, No. 1, Jan. 1988.*

Maskell, Brian H., Distribution Resource Planning—Part 2—A Practical Approach Manufacturing Systems, vol. 6 No. 7, Jul. 1988.*

Tersine, Richard J. et al., Optimal Stock Replenishment Strategies In Response to Temporary Price Reductions Journal of Business Logistics, vol. 10, No. 2, 1989.*

Landvater, Darryl, World Class Production and Inventory Management, John Wiley and Sons, Inc., Second Edition, 1997, p. 71-73, 101-106 (11 pages).

"Managing the demand chain through managing the information flow: Capturing 'moments of information,'" by Rhonda R. Lummus and Robert J. Vokura, Production & Inventory Management Journal, V40n1, pp. 16-20, First Quarter, 1999, [Dialog File 15: 01870613] (6 pages).

"Effective inventory management starts at the store," Drug Store News, v20, n12, p. 52, Aug. 3, 1998, [Dialog File 16: 05754620] (3 pages).

"Forecast Views: Retailers and Vendors Are Starting To Collaborate To Take Guesswork Out of Ordering By Refining Planning Methods," by Linda Purpura, Supermarket News, v48, n23, p. 61(1), Jun. 8, 1998, [Dialog File 148: 1267037] (3 pages).

"Order Planning and Explosion" *MRPII Standard System-A Handbook For Manufacturing Software Survival*, by Darryl V. Landvater and Christopher D. Gray, Chapter 7, pp. 75-82. (1995), (10 pages).

Related U.S. Appl. No. 10/620,110, filed Jul. 15, 2003 in the name of Darryl V. Landvater.

Notice of Allowance dated Sep. 17, 2008 with regard to related U.S. Appl. No. 10/620,110.

Response to First Office Action dated Jun. 30, 2008 with regard to related U.S. Appl. No. 10/620,110.

First Office Action dated Mar. 31, 2008 wtih regard to related U.S. Appl. No. 10/620,110.

\* cited by examiner

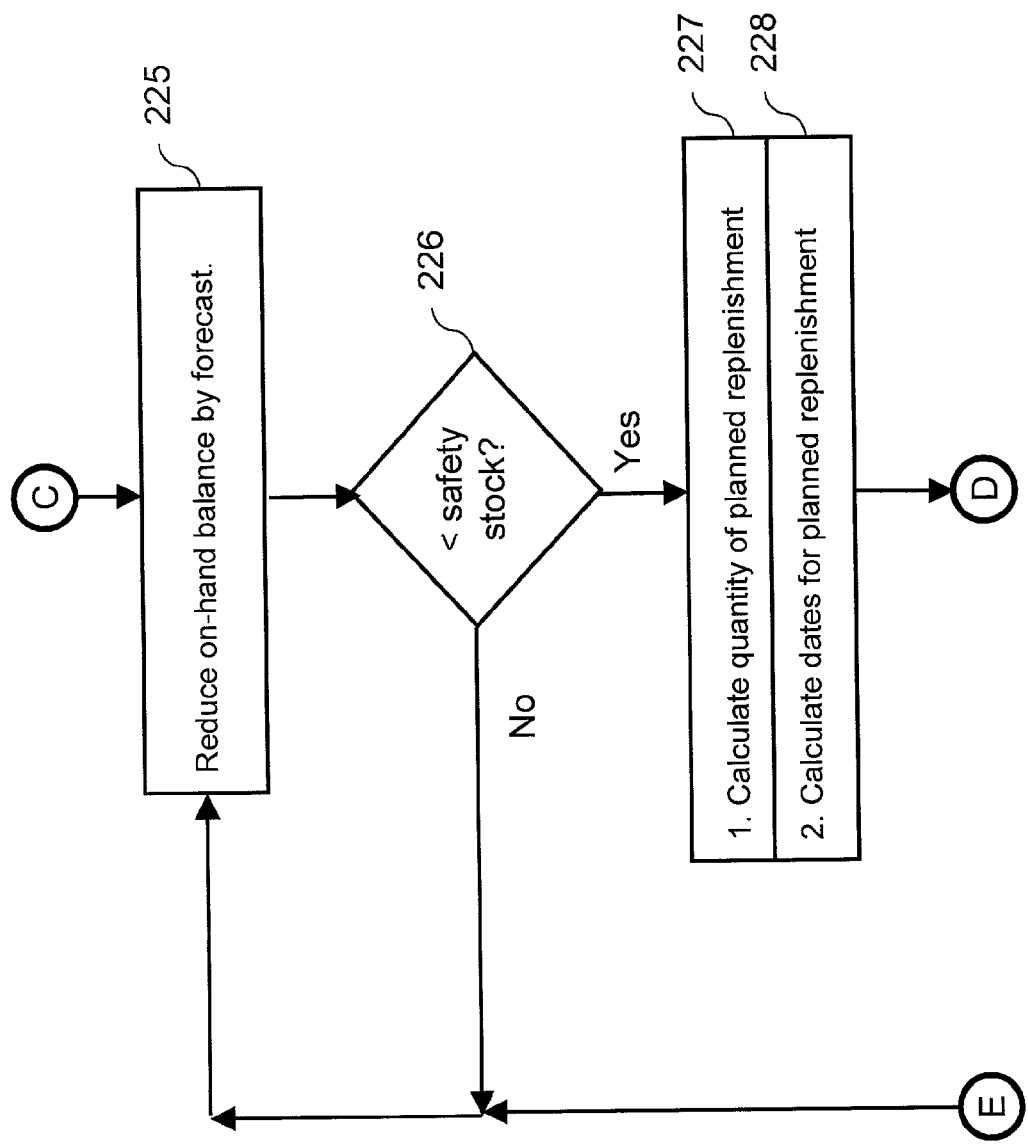

METHOD AND SYSTEM FOR RETAIL STORE SUPPLY CHAIN SALES FORECASTING AND REPLENISHMENT SHIPMENT DETERMINATION

FIELD OF THE INVENTION

The invention relates to a computer-implemented method and system for simulating the business of retail organizations for the purposes of better managing inventories transportation, capacity, and finances at both retail organizations and/or suppliers. More particularly, the invention is a method and system for forecasting product sales in a retail store supply chain and determining replenishment shipments to various entities in the supply chain.

BACKGROUND OF THE INVENTION

The typical retail organization uses a reorder point system to manage inventories at the store-level. These are execution systems rather than planning systems. They review products and if the on-hand balance is below a preset number (the reorder point), an order is created to replenish inventory. If the on-hand balance is above the reorder point, no further action is taken. No projections are made into the future for the purposes of planning product requirements from the suppliers or manufacturers. No projections are made for the purposes of planning projected inventory levels. These are strictly inventory management systems designed to release orders at the appropriate time.

Manufacturing companies have used time-phased planning systems (also called DRP or Distribution Resource Planning or Distribution Requirements Planning) beginning with implementations in 1975. These systems provide projections into the future which can be used to plan product requirements, transportation requirements, capacity requirements and financial requirements. However, these systems are designed to meet the needs of a manufacturing organization, and have not proved suitable for a retailer's needs. These systems are not able to process the large data volumes typical of most retail organizations. Additionally, manufacturing systems are not designed to deal with certain needs that are specific to retailers.

A typical manufacturing organization of the type that would supply retail stores might stock several hundred to a thousand products at one to ten different suppliers. This results in ten thousand stock keeping locations. A typical retailer might stock ten thousand to fifty thousand products in one to several thousand locations. This results in as many as 100 million stock keeping locations. Systems designed for tens of thousands of stock keeping locations could theoretically be made to work for a hundred million stock keeping locations, but as a result of limitations in computing resources and time available to complete the computing operations this has not been achieved in actual practice. There are numerous technical hurdles to overcome in order to process the amount of data for a retail store supply chain during the relatively short time window in which the processing needs to be done when the system is operated in batch processing mode. Most retailers get their sales history (or point of sale data or POS) late in the evening or in the early hours of the morning. Several hours later, the replenishment planning must be complete in order to load trucks for deliveries. Additionally, using systems not designed to economically process this amount of data would force the retailer to purchase significantly more computer processing power than would be needed with a system designed for these volumes (assuming such a system existed).

Many retail stores stock a significant number of products that would be categorized as low volume or slow-moving products. Rather than selling thousands of a particular product at a particular store during a year, the retail store might sell only 5 or 20 of the product in a year. While any one of these low-volume products do not make up a large percentage of a retailer's shipments, in total, low volume products do constitute a significant percentage of a retailer's shipments. Therefore, any time-phased planning system for retail must include a way to deal with these low-volume products.

Manufacturing companies also stock low-volume products. However, the percentage of a manufacturer's shipments that would be considered low volume is typically much less than the percentage of a retailer's shipments that would be considered low volume. For this reason, current time-phased planning systems do not provide the same capabilities for low-volume products.

Known time-phased planning logic for calculating planned replenishment shipments for low-volume products typically gives an inaccurate picture of total demand for the product, of total demand for transportation planning, of total demand for capacity planning, and of total demand for financial planning. Such known logic subtracts the forecast from the projected on-hand balance to give the new projected on-hand balance. If the new projected on-hand balance is below the safety stock, a planned replenishment shipment is either created, or an existing planned replenishment shipment is automatically rescheduled to the need date. In this context, rescheduling means changing the receipt date from whatever value currently exists to the date of the forecast which caused the projected on-hand balance to drop below the safety stock. In addition, rescheduling means changing the ship date of the planned replenishment shipment to the receipt date less the lead time.

To illustrate how known logic typically handles low-volume products, assume a low-volume product sells such that the daily forecast is 0.01 unit per day for the first day, and the on-hand balance in the store is 2, and the safety stock is 2. The projected on-hand balance calculation for the first day would give a new projected on-hand balance of 1.99. Since 1.99 is less than the safety stock of 2, a planned order would be created for immediate shipment to the store.

This is not what most retailers would want done. The forecast of 0.01 unit is so small that it is not appropriate to send one product to the store in anticipation of this sale. Most retailers would rather wait until a sale happens and the product is below the safety stock before shipping a product to the store. For example, as long as the on-hand balance in the store equals the safety stock (2 in this example), no planned shipments would be made to the store.

An additional consequence of the way in which known logic handles low-volume products is that a large number of planned replenishment shipments for such products will tend to "bunch up" or accumulate in the first few time periods. For example, several thousand planned replenishment shipments for low-volume products may exist in the first few days, and then the number of planned replenishment shipments for low-volume products would drop to either zero or a very small number. However, this "bunching up" does not represent a valid simulation of what is likely to happen. Instead of several thousand shipments for low-volume products happening in the first few days and then no shipments happening after that, there will typically be some shipments for low-volume products each day out into the future. For this reason, the traditional logic of time-phased replenishment planning does not handle low-volume products well.

In addition to planning for product replenishment, retailers also need to plan for transportation and capacity. Transportation is the weight and cube (i.e., three-dimensional volume) of merchandise that needs to be transported from one location to another. Capacity is the manpower or equipment needed to pick, pack, receive, and store the merchandise either in the distribution centers or the stores.

Traditional systems for retail have tended to be implemented as separate systems by function, such as a replenishment system, a transportation planning system, a capacity planning system, and so on. As a result, these systems tended to have different numbers for given products at a specific point in time. For example, the replenishment system may have a large shipment scheduled to be received into the distribution center in ten weeks, yet the transportation planning system, which might have been using the history of shipments from last year, did not show this order. As a result, several sets of numbers existed in these systems, as opposed to a single set of numbers that are used by all systems. Consequently, when people in one department attempt to work with people in other departments, a good deal of unproductive time is often spent reconciling the numbers in one system to the numbers in one of the other systems.

SUMMARY OF THE INVENTION

One aspect of the present invention is a computer-implemented forecasting system for determining time-phased sales forecasts and planned replenishment shipments for products that sell in low volumes in a retail store supply chain. The system comprises: a) a forecasting system that determines projected sales of a plurality of low-volume products for a retail store in the supply chain during a first time period and b) a replenishment shipment system for distributing within the first time period shipment dates for each of the plurality of low-volume products using at least one of seasonal selling profile for each of the low-volume products during the first time period and randomization techniques.

Another aspect of the present invention is a computer-implemented system for determining time-phased product sales forecasts and projected replenishment shipments for a retail store supply chain on a continuous basis using product sales history records generated by the retail stores. The system comprises a forecasting system that determines projected sales of a plurality of products for a retail store in the supply chain using the product sales history records for said retail store. The forecasting system re-forecasts the projected sales relative to at least some of the plurality of products immediately following occurrence of transactions for the at least some of the plurality of products that would invalidate the projected sales determination for the at least some of said plurality of products. The system also comprises a replenishment system that determines projected replenishment shipments of products to the retail store from one or more first entities in the retail store supply chain using the projected sales determined by the forecasting system. The replenishment system re-plans the projected replenishment shipments relative to at least some of the plurality of products immediately following occurrence of changes in transactions for the at least some of the plurality of products that would invalidate the projected replenishment shipments for the at least some of the plurality of products.

Yet another aspect of the present invention is a computer-implemented replenishment shipment and transportation planning system for a plurality of products that sell in a retail store supply chain. The system comprises: a) a replenishment shipment system that determines planned shipment dates for a plurality of products to a retail store in the supply chain based on sales forecasts for the products; and b) one or both of a capacity planning system that generates capacity plans, and a transportation planning system that generates transportation plans, for the plurality of products using the planned shipment dates determined by the replenishment system.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein:

FIGS. 10a-10c are sequential flow diagrams illustrating the overall logic used for replenishment planning;

DETAILED DESCRIPTION OF THE INVENTION

Figure 1:
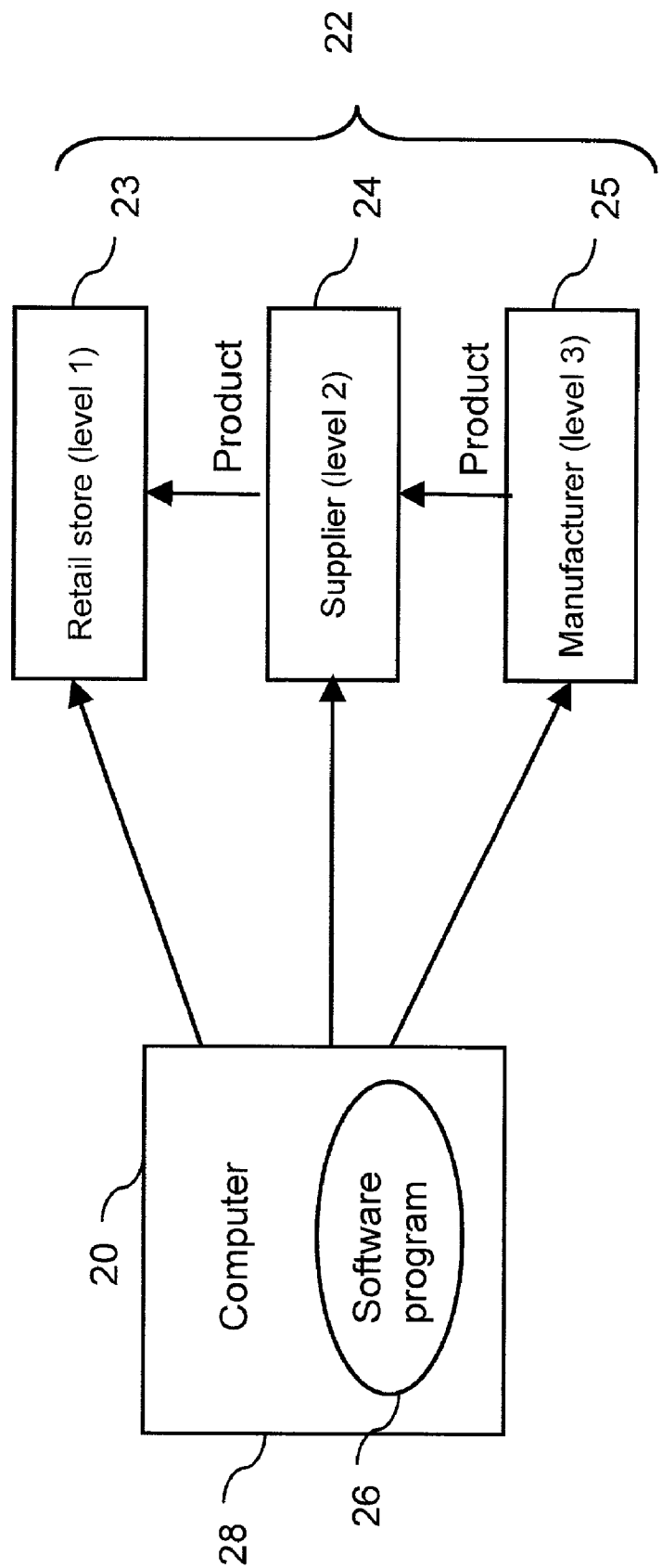
FIG. 1 is a schematic diagram of the system of the present invention and the retail store supply chain with which it is used.
Figure 2:
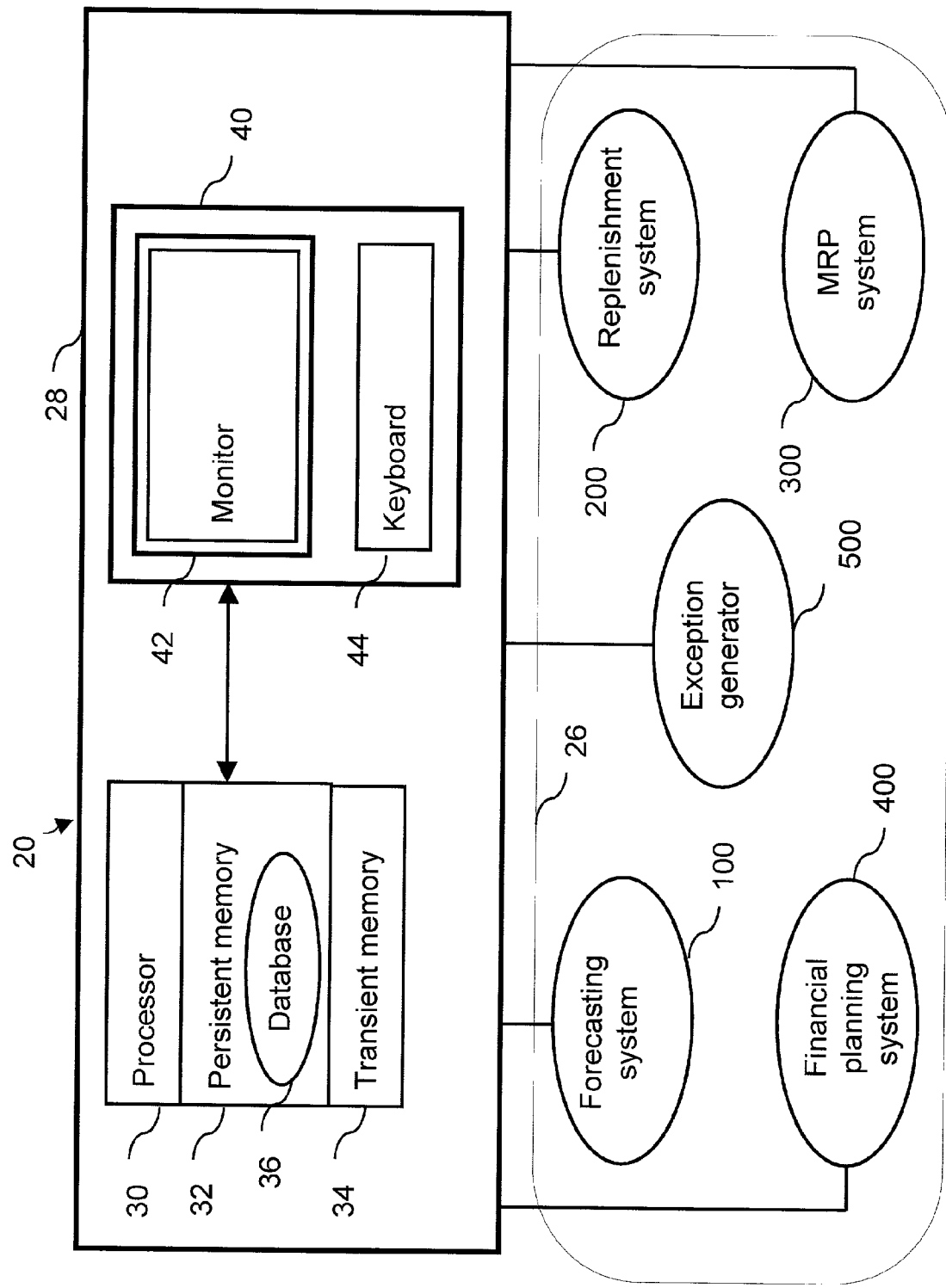
FIG. 2 is a schematic diagram of the system of the present invention.

Referring to FIGS. 1 and 2, the present invention is a time-phased planning system 20 for use in a retail store supply chain 22 having one or more retail stores 23 (the first level in the supply chain), one or more suppliers 24 (the second level in the supply chain) and one or more manufacturers 25 (the third level in the supply chain). Retail store 23 can be a "bricks and mortar" store of any size or type, e.g., a small general store or a large "warehouse" store of a national chain. In addition, retail store 23 may be a so-called "clicks and bricks" store in which products are purchased on-line from a traditional store. Further, retail store 23 may be a pure e-commerce organization. Supplier 24 could be any one of the following facilities: a retail supplier, a satellite supplier, a retail depot, a wholesaler, an independent distributor, a manufacturer's supplier, or a manufacturer's plant. Manufacturer 25 could be any one of the following facilities: a manufacturer's distribution center, a wholesaler, an independent distributor, a manufacturer's supplier, or a manufacturer's plant. For purposes of illustration, this third level in the supply chain will be generally referred to as manufacturer 25, recognizing that this level could be any of a number of different types of facilities, depending on the supply chain for a particular product. For example, a weight set might be stocked at retail store 23, and the store supplied by supplier 24 that is a retail distribution center (level 2) and the retail distribution center supplied by a manufacturer 25 that is a manufacturing plant (level 3). In another situation, this weight set might be supplied to retail store 23 by a supplier 24 that is a retail cross-dock distribution center (level 2) and the retail cross-dock distribution center is supplied by a manufacturer 25 that is a manufacturer's distribution center (level 3), and the manufacturer's distribution center is supplied by a manufacturing plant (level 4, not shown on the diagram). In a third situation, the weight set at retail store 23 might be supplied by supplier 24 that is an independent distributor (level 2), and the independent distributor is supplied by a manufacturer 25 that is a manufacturing plant (level 3).

There are any number of other permutations of this supply chain, each of which may be appropriate to the distribution of a particular product to a retail store or stores. The important element is not the specific structure of the supply chain for a particular product at a particular store, or the number of levels in the supply chain, but rather the fact that multiple customer-supplier relationships exist in the supply chain, and these can be integrated into a single planning and replenishment network. The levels in this network can have the same or different systems 20, yet the network functions as a whole. This is analogous to the Internet where different types, models, and manufactuer's computers are integrated into a network. Where the common language of the Internet is the transmission control protocol/internet protocol (TCP/IP) protocol, the common language of the supply chain network is the schedule of projected replenishments between any two nodes in the supply chain (e.g., a retail store 23 and a supplier 24).

System 20 may be implemented as a software program 26 that is executed using one or more computers 28. As described in more detail below, software program 26 used in system 20 includes a forecasting system 100, a replenishment system 200, an MRP system 300, a financial planning system 400 and an exception generator 500. Computer 28 includes processor 30, persistent memory 32, transient memory 34, a database 36 of product and other information is stored in persistent memory 32, and a user interface 40. Persistent memory 32 has a relatively high capacity, and a relatively slow access time, and includes memory such as magnetic or optical disk drives. Transient memory 34 has a relatively low capacity, and a relatively fast access time, and includes memory such as random access memory (RAM) semiconductor devices. Various elements may be included in user interface 40, including a monitor 42 and a keyboard 44.

Figure 3:
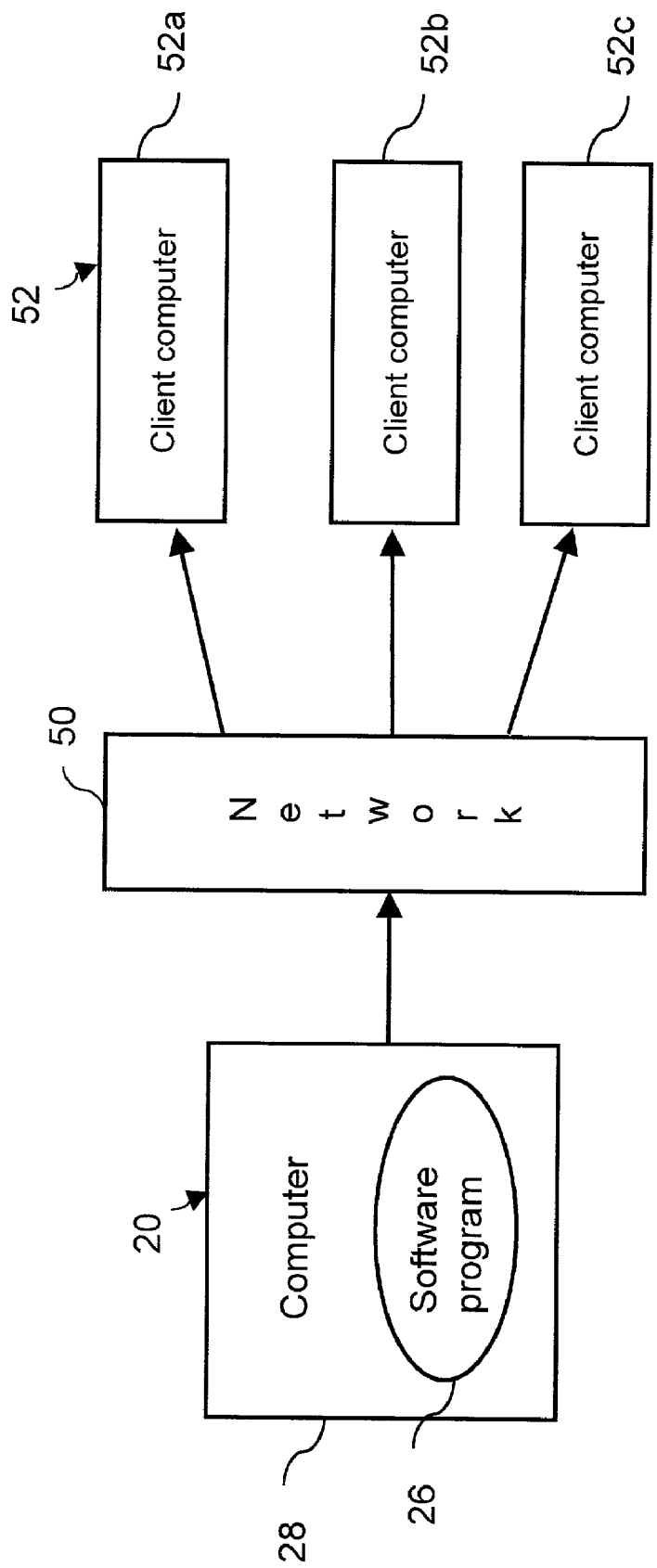
FIG. 3 is a schematic diagram of one implementation of the system.
Figure 4:
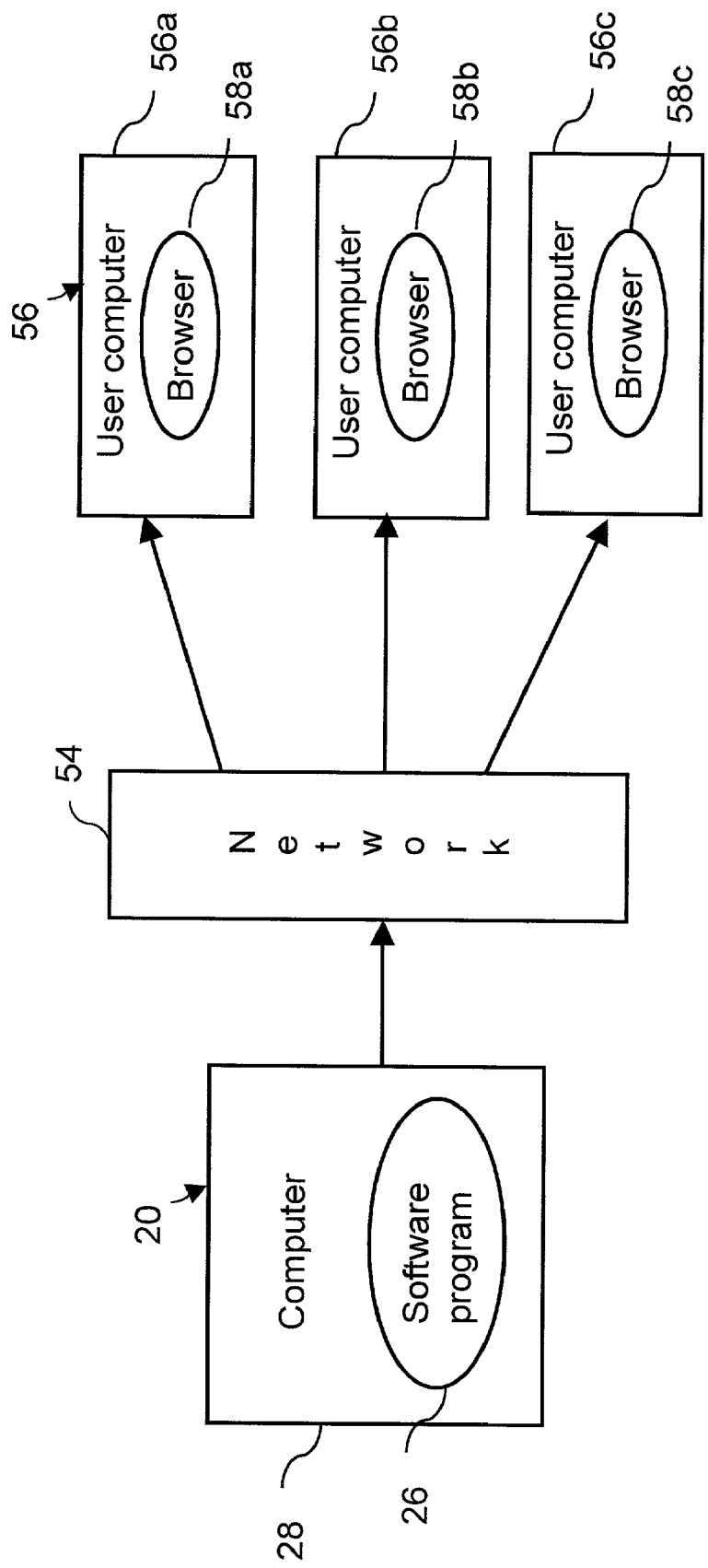
FIG. 4 is a schematic diagram of another implementation of the system.

Turning next to FIGS. 3 and 4, system 20 may be implemented in several ways. In some cases, system 20 may be implemented as a standalone system where computer 28 does not deliver the results of its planning system computations to other computers but displays the results to a user. Alternatively, as illustrated in FIG. 3, it is desirable in some situations to implement system 20 in a client-server networked computer system. With this implementation, computer 28 is a server and is connected via network 50 to multiple client computers 52, e.g., client computers 52a, 52b and 52c. In yet another implementation of system 20, illustrated in FIG. 4, computer 28 is connected via the network 54 to multiple user computers 56, e.g., user computers 56a, 56b and 56c, each of which has a browser 58 for providing navigation capabilities within network 54. The latter would comprise the Internet, an intranet, an extranet, electronic data interchange ("EDI") networks or other networks. User computers 56 may include without limitation PCs, various "thin client" or "Internet appliance" devices such as pagers, cell phones, digital assistants, and other devices permitting connection to and navigation within the network 54. Also, in the implementation illustrated in FIG. 4, computer 28 may be multiple computers that are interconnected via network 54 so as to work together.

Figure 5:
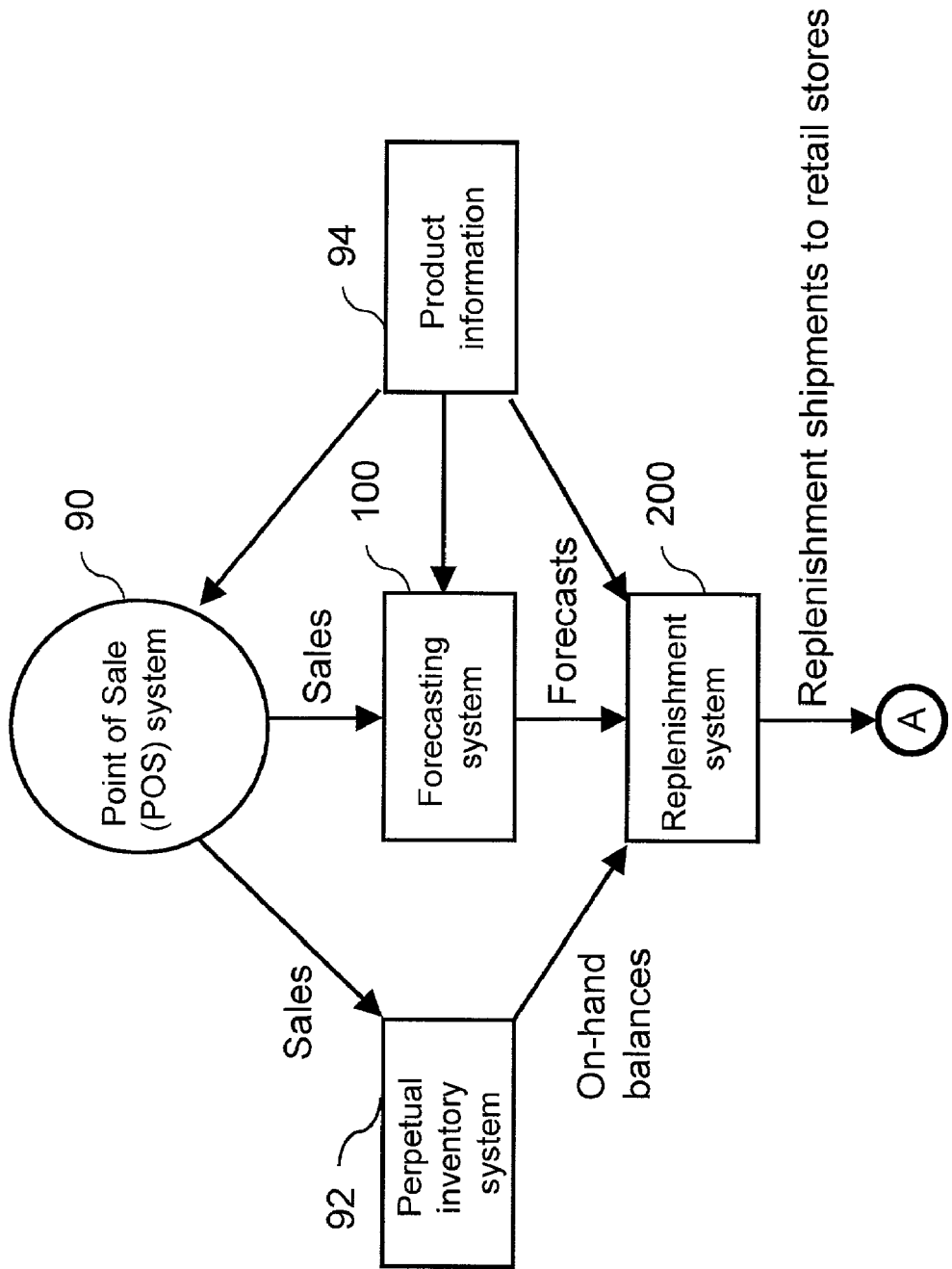
FIG. 5 is a schematic diagram illustration the interrelationship of elements of the system and inputs to the system at the retail level, i.e., at the top level in the supply chain.

Describing the invention in somewhat greater detail, FIG. 5 illustrates how system 20 operates at the level of retail store 23 (FIG. 1). A conventional point of sale (POS) system 90 provides sales information in the form of products sold, quantities sold, and date sold. A suitable POS system 90 is sold by Cornerstone Systems of Austin, Tex., and is identified as BEETLE, although nearly any POS system would also work. This POS information is used for two purposes. The first purpose is to provide a sales history for use in creating a statistical forecast of projected sales for each product at each location. The second is to update the perpetual inventory in perpetual inventory system 92, which permits reduction in the on-hand balance maintained for each product at each location. Product information 94 from a database (not shown) for retail store 23 is also used in calculating the sales forecasts. Product information 94 includes product descriptions, on-hand product inventory and parameters used in forecasting and replenishment such as typical shipping quantities, time periods to use in forecasting, and so on.

Forecasts from forecasting system 100 are used as inputs to replenishment system 200. Forecasts represent projected sales. Planned replenishments represent projected shipments to retail store 23, which will be received into inventory. The differences between what is projected to be sold and what is projected to be shipped include: the amount of inventory already on hand at retail store 23, the case size (or economical shipping size), the dates when deliveries can be made to the store, the lead time (or transit time) from supplier 24 to the retail store 23, the number of days or weeks of supply that should be delivered at one time to prevent an excessive number of small deliveries, and projected changes to the arrangement of products on the store shelf. As with forecasting system 100, product information 94 from a database for retail store 23 is typically used in the replenishment planning process.

Projected replenishment shipments to retail store 23 are then passed to the store's supplier 24 at the second level of the supply chain. This is shown in FIG. 5 by the connector marked A. Based on the projected replenishment shipments, supplier 24 provides replenishment shipments to retail store 23.

Figure 6:
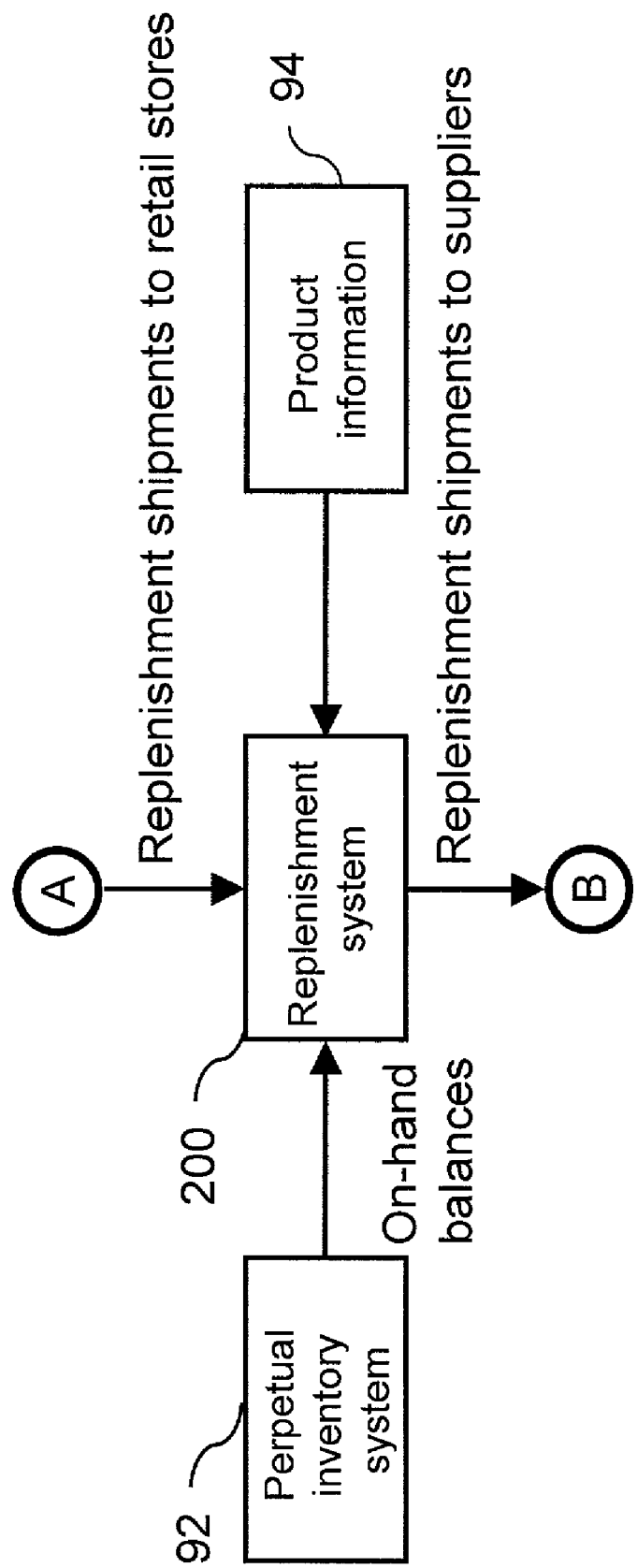
FIG. 6 is a schematic diagram illustrating the interrelationship of elements of the system and inputs to the system at the supplier level, i.e., at the second level in the supply chain.

FIG. 6 illustrates how system 20 operates at the level of supplier 24, i.e., at the second level of supply chain. In this case, there is typically no statistical forecasting system. Instead, the projected replenishment shipments from the replenishment system 200 for retail stores 23 are summarized and used in place of a statistical forecast. The sum of these projected shipments provides a more accurate projection of demand on suppliers 24 than a statistical forecast based on historical shipments. In some situations, it may be desirable to use a small statistical forecast at this second level of the supply chain. For example, a supplier 24 that is a retail distribution center can supply a number of retail stores 23, and in addition service customer orders for products not normally stocked at some stores, or service telephone or Internet customer orders for products to be shipped directly to customers. In any of these situations, the projected shipments to the stores are added to a statistical forecast representing the customer demand for products ordered from stores where these products are not stocked or the demand from telephone or Internet sales, to give the total demand at the retail distribution center or other supplier 24 at the second level in the supply chain.

The sum of the projected replenishment shipments to retail stores 23 is used as input to replenishment system 200 at suppliers 24. The sum of the projected replenishment shipments to retail stores 23 represents what will be shipped out of suppliers 24. Planned replenishment shipments to suppliers 24, when the second level in the supply chain, represent projected shipments from other suppliers 24 and manufacturers 25 at lower levels in the supply chain. Depending on the product and stores, the second and third levels of the supply chain could be any number of different types of facilities, such as wholesalers, independent distributors, manufacturer's distribution centers, manufacturing plants, and so on. Differences between what will be shipped from the second level in the supply chain (suppliers 24) and what is projected to be shipped into this level include: the amount of inventory already on hand at the suppliers, the case or pallet size (or economical shipping size), the dates when deliveries can be made to the suppliers, the lead time (or transit time) from the supplier to the suppliers, the number of days or weeks of supply that should be delivered at one time to prevent an excessive number of small deliveries, shelf configuration and projected changes to safety stock at the suppliers. As with replenishment system 200 at the level of retail store 23, product information from the organization's database is used in the replenishment planning process for suppliers 24.

As mentioned earlier, many supply chains have multiple levels of suppliers, each supplying one another. This is shown by the connector in FIG. 6 marked B.

Figure 7:
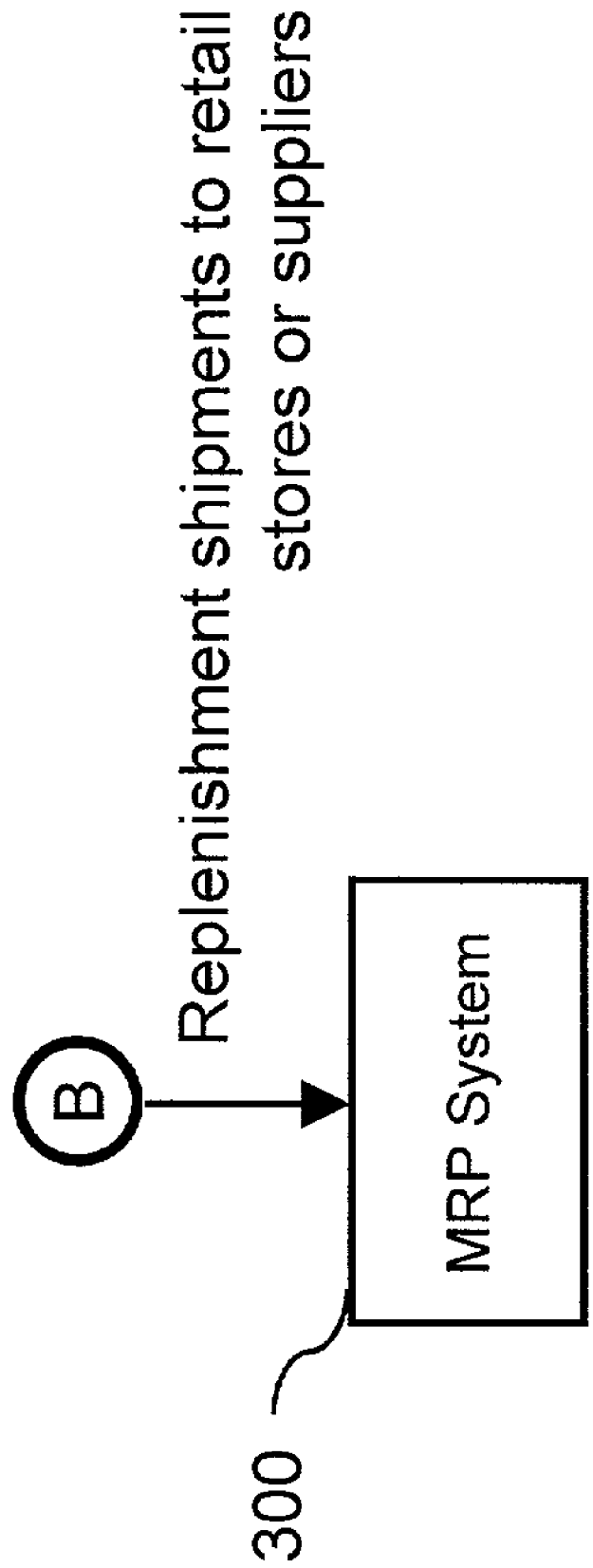
FIG. 7 is a schematic diagram illustrating the Manufacturing Resource Planning (MRP) system of the system at the manufacturer level, i.e., at the third level in the supply chain.

FIG. 7 illustrates system 20 at the level of manufacturer 25, which is the third level of the supply chain. As mentioned earlier, manufacturer 25 could be a wholesaler, independent distributor, manufacturer's distribution center, or manufacturing plant. Assuming the third level is a manufacturing plant, the projected replenishment shipments are input into manufacturing planning system 300. In the situation where the supply chain for a product or set of products is from a manufacturing plant direct to the retail store 23, the systems shown in FIG. 6 would be absent, and the projected shipments represented by connector A would drop down and be identical to connector B on FIG. 6. In effect, the lack of a distribution center-type supplier 24 means this level is absent from the supply chain, and the store-level systems represented in FIG. 5 would connect directly with the manufacturing systems represented in FIG. 7.

Manufacturing planning system 300 used by most manufacturers is a time—phased planning system. Generally, these systems are called MRP, MRP II, Material Requirements Planning, Manufacturing Resource Planning, Enterprise Resource Planning, or ERP systems. Like the DRP systems mentioned above, these MRP systems provide projections into the future which can be used to plan product requirements, capacity, and finances. Manufacturing planning system 300 starts with a forecast of customer demand. Customers using time-phased planning system 20 electronically transmit their projected replenishment shipments to manufacturer 25. The latter can use this information instead of a statistical forecast of customer needs, providing more accurate projections of future shipments to customers. Manufacturer 25 creates a master production schedule based on the anticipated customer needs. This is a schedule of future production. The master production schedule is then broken down into the detailed material and capacity requirements. The bill of material is used to identify what materials go into each product, and the quantities of each that are needed. This information, in addition to the quantities of material that are on hand and on order from suppliers, and the appropriate ordering quantities for different items, are all used to create the detailed time-phased plan for material. The detailed time-phased plan for material is then extended by the routing to give the detailed capacity requirements. A routing is a list of manufacturing steps, showing the number and skill level of labor hours required, the type of machinery required. These capacity requirements are then summarized by labor skill level and equipment and used to make decisions on hiring, subcontracting, acquiring new equipment, and so on. The detailed material and capacity plans in addition to the anticipated customer demands can then be multiplied by the cost and selling price information to provide financial projections which can be used to do cash planning, profit projection, and so on. Manufacturing planning system 300 receives valuable input from system 20 in the form of more accurate projected customer demands.

Forecasting

System 20 is designed to permit extremely large numbers of products to be planned on relatively inexpensive computers. This allows organizations with very large amounts of data, like retailers for example, to be able to use system 20. Two different methods are used to streamline the processing: (1) storing forecasts in weekly, monthly, and longer time periods, and (2) converting these forecasts into daily time periods for a user-specified number of weeks, and then weekly time periods for the remainder of the planning horizon.

Figure 8:
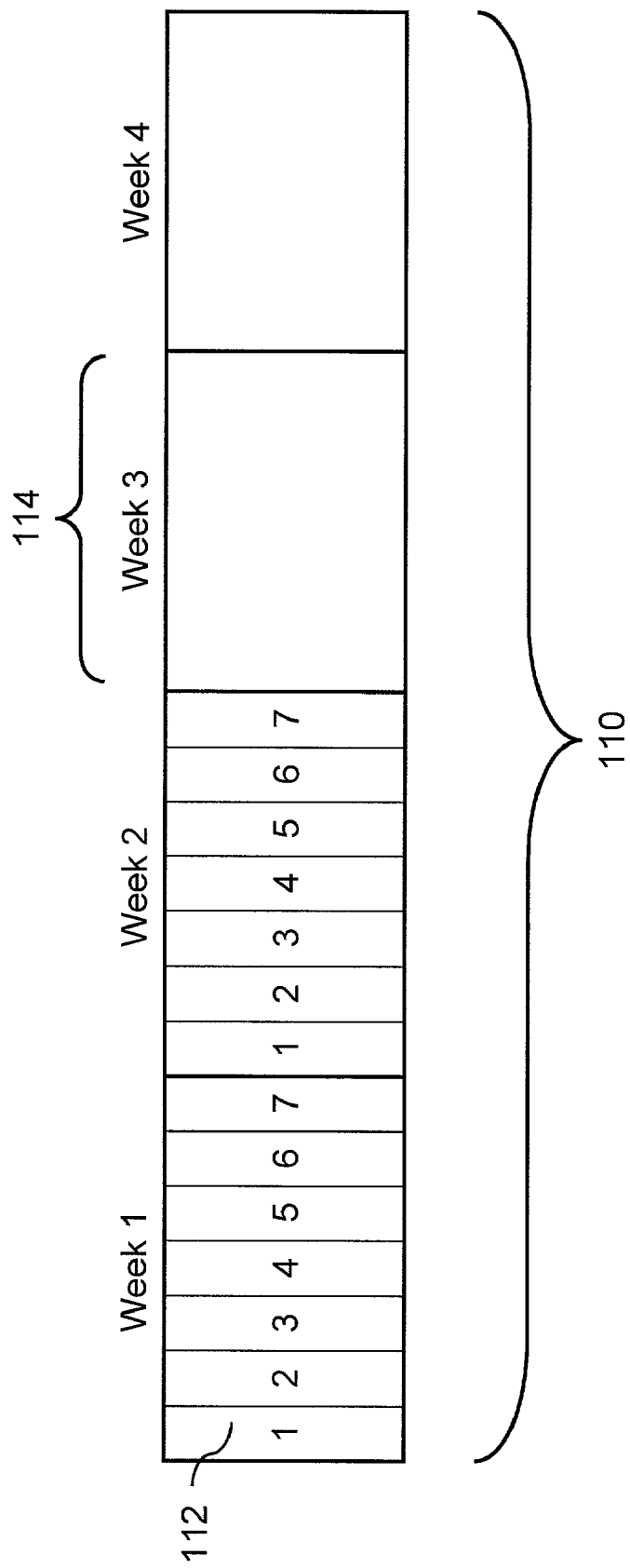
FIG. 8 is a schematic representation of how forecasts are stored in memory with the system.

Referring to FIGS. 2 and 8, it is a fact that many retail stores 23 sell relatively low volumes for many of the products they stock. For example hot sauce may only sell eighteen units per year. It is difficult to say exactly when one of these bottles of hot sauce will sell. However, it is reasonable to forecast that an average of one and a half will sell each month. Given this level of imprecision, there is no reason to store four weekly forecasts in database 36 as compared to one monthly forecast. Reading four weekly forecasts from database 36 is a relatively expensive operation in terms of computer processing as compared to reading one monthly forecast from the database and breaking the monthly forecast into daily and weekly forecasts in memory. FIG. 8 illustrates this processing. A single monthly forecast 110 is read from database 36 which is stored in persistent memory 32. In transient memory 34, forecast 110 is then broken into a user specified number of daily forecasts, say fourteen daily forecasts 112 for weeks 1 and 2 and weekly forecasts 114 for the remaining weeks such as weeks 3 and 4.

Similarly, the replenishment calculations are done using the fourteen daily forecasts 112 and two weekly forecasts 114 for weeks 3 and 4 using average values for the forecast quantity. FIG. 8 illustrates a one-month planning horizon for simplicity. Most retailers would use planning horizons of 3 to 12 months.

Pareto's Rule applies to products in the typical retail store. Eighty percent of the products sell in small volumes and a monthly or less frequent forecast is appropriate. Only twenty percent or less of the products in the typical retail store require weekly forecasts be stored in database 36.

In a typical store with thirty thousand products, weekly forecasts 112 would create a database 36 with 1.56 million forecast rows (or records). By storing the forecasts in weekly, monthly, and longer time periods, the number of forecast records is reduced to 330 thousand forecast rows (or records), or about 20 percent of the number of records that would be required if weekly forecasts were stored.

Figure 9:
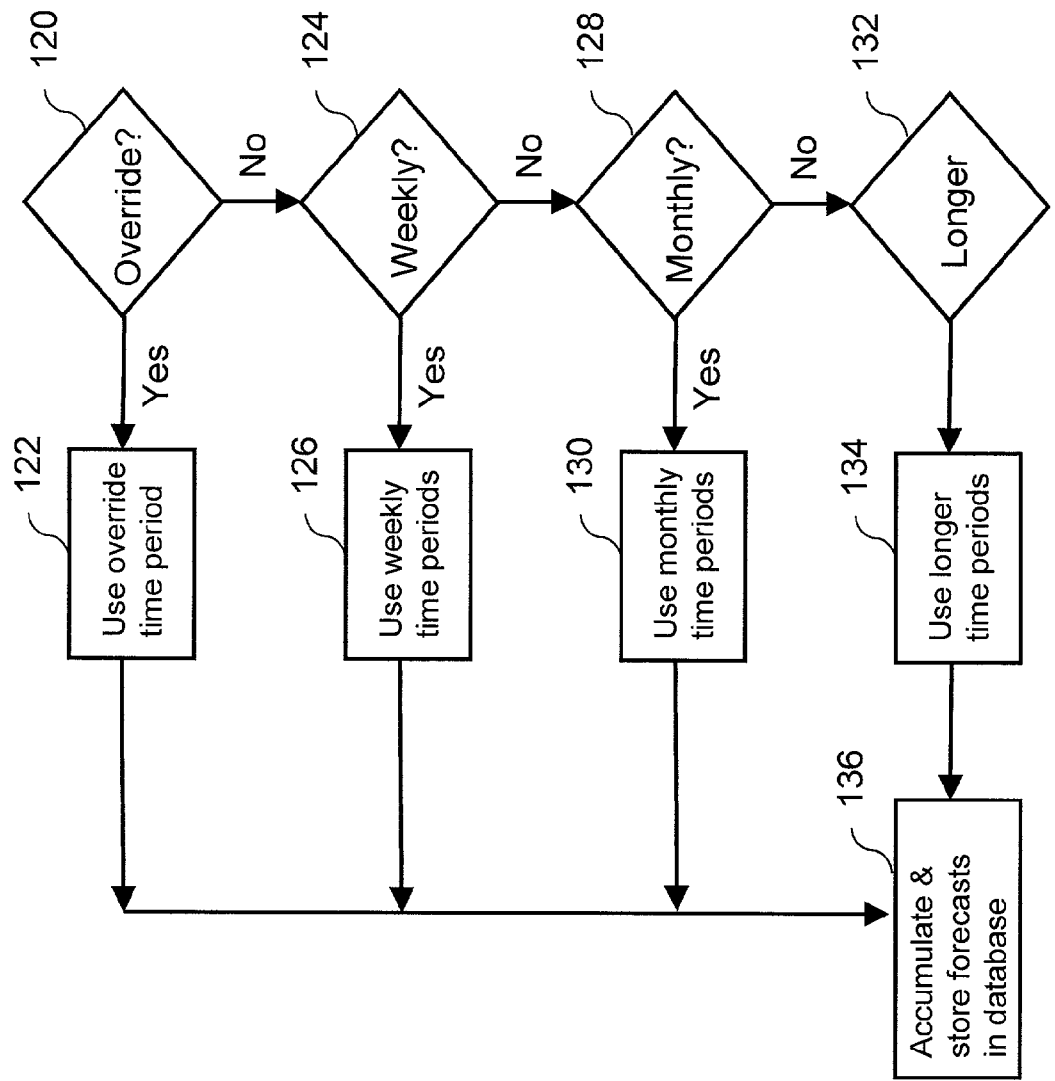
FIG. 9 is a flow diagram illustrating the logic used for determining time periods for forecasting.

Turning next to FIGS. 2, 8 and 9, forecasting system 100 uses various logic to determine the time periods for forecasting. In the flow diagram of FIG. 9, as well as in other flow diagrams in the Figures, it is to be appreciated that the logic or operations represented are implemented in conventional manner using software programming languages, architectures, data flows and other features known to those skilled in the art. Processor 30, together with memory 32 and 34, reexecutes logic or operations implemented by the software by creating reprogrammable logic and other circuits to execute such logic or operations in the software. Discussing how known forecasting periods are determined, if at step 120 it is determined that an override to a normal forecast period is specified, then override time period is used, as indicated by step 122. For example, if a product would normally be forecast using monthly forecasts 110, but a planner or analyst wants to override this logic and force the system to use weekly forecasts 114, this logic will cause forecasting system 100 to forecast in weekly time periods. System 20 permits users to specify an override to the forecasting time period at several levels. For example, users can set a category of products to weekly, monthly, or longer forecasting time periods. Additionally, users can specify a forecasting time period for a certain product at a certain location (retail store 23 or supplier 24).

If an override is not specified, the logic proceeds to step 124 where a determination is made if the projected annual sales forecast for a product at a location exceeds the user-specified threshold for weekly forecasting (100 products, for example). If so, weekly forecasting is used, as indicated by step 126. If not, then the logic proceeds to step 128.

At step 128 a determination is made if the projected annual sales forecast for a product at a location is less than the user-specified threshold for weekly forecasting (a sales rate of 100 products year, for example), and greater than the user-specified threshold for monthly forecasting (a sales rate of 12 products per year, for example). If so, then monthly forecasting is used, as indicated by step 130. If not, then the logic proceeds to step 132.

At step 132 a determination is made if the projected annual sales forecast for a product at a location is less than the user-specified threshold for monthly forecasting (a sales rate of 12 products per year, for example). If so, then a longer time period is used for forecasting, as indicated by step 134. The longer period may be user specified, and could be any length of time, but for purposes of illustration might be one quarter of a year, or one-half a year.

In the case of monthly or longer forecast periods, weekly forecasts are accumulated into months (four or five weeks) or longer periods, and are then stored in the database 36, as indicated by step 136.

Replenishment Planning

Referring next to FIGS. 2 and 10, system 20 provides projected replenishment shipments using replenishment forecasts using replenishment system 200. The latter performs replenishment plans in daily time periods for a user-specified number of weeks, and then converts to weekly time periods for the remainder of the planning horizon.

In the near term, it is essential to do replenishment planning in days. Suppliers 24 need to know what products must be shipped today, tomorrow, and so on. It is not good enough to say what has to be shipped this week and not specify when during the week the products should be shipped.

However, in the longer term, it is not important to schedule in terms of days. Weekly scheduling is adequate. For example, suppliers 24 do not need to know what day a product will be shipped twenty weeks from today. That far into the future, planning in weekly and monthly time periods is sufficient.

Assuming for example, that two thousand computer instructions need to be executed for each time period which is planned, a company planning fifty-two weeks into the future in daily time periods would have to execute 728 thousand computer instructions for each product. If this same company were to plan four weeks into the future in daily time periods and remaining forty-eight weeks in weekly time periods, only 152 thousand computer instructions would have to be executed, or about twenty percent of the instructions needed to plan entirely in days.

Figure 10A:
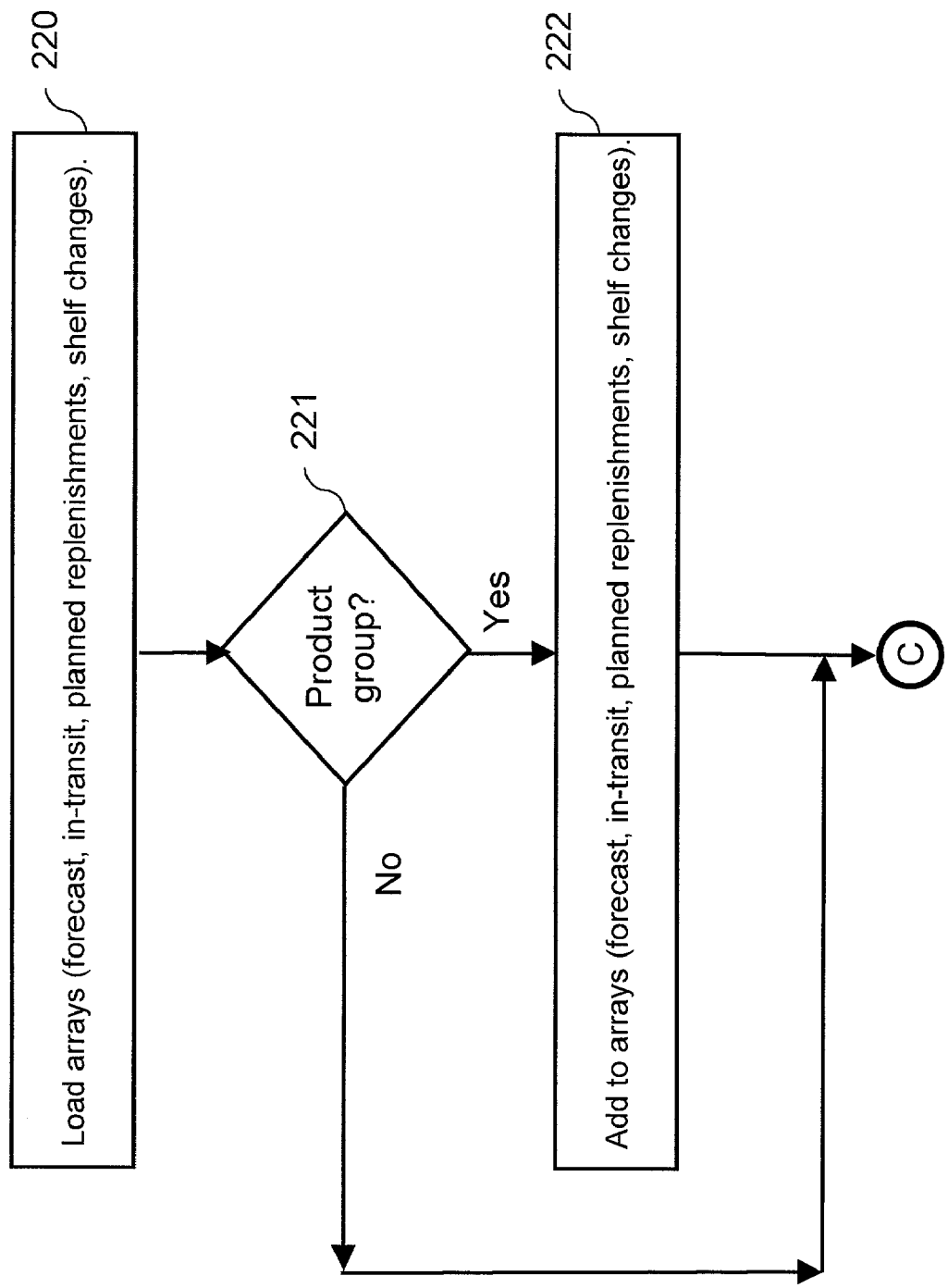
Figure 10C:
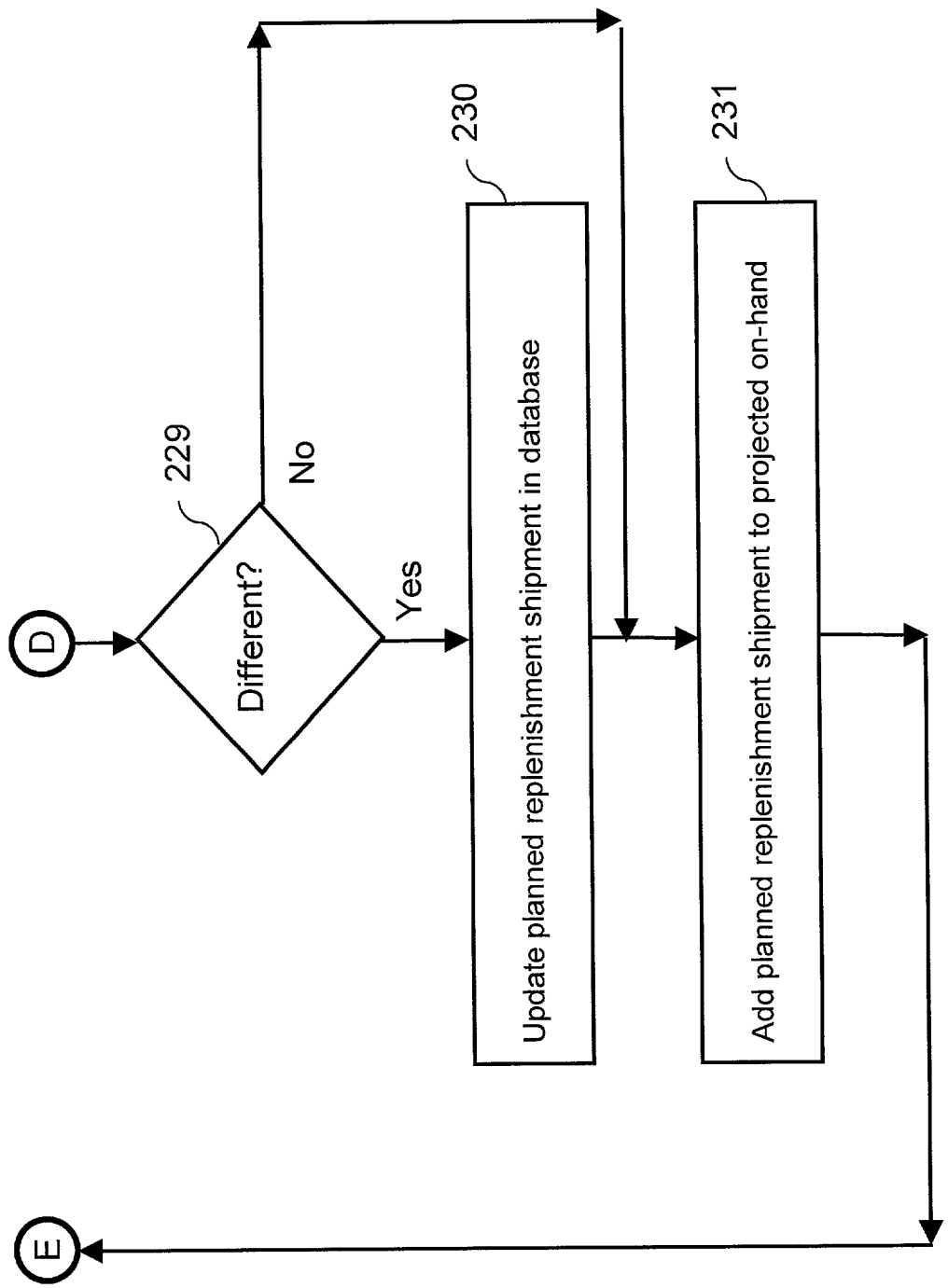

The logic for accomplishing replenishment planning is illustrated in FIGS. 10*a*-10*c*. The process begins at step 220 by reading a series of rows from the database 36 and then loading the rows into arrays in transient memory 34. These arrays include forecast, in-transit, planned replenishment and shelf change information for a product with respect to which projected replenishment shipments are to be generated. Next, at step 221, a determination is made if the product has other products in its group (packs and cartons of cigarettes for example). If so, then at step 222 these products are added to the arrays.

Next, at step 225, the process commonly referred to as netting is performed. This is accomplished by reducing the beginning on-hand balance by the forecast quantity. Then at step 226, a determination is made if the resulting projected on-hand balance is less than the safety stock. If not, this process is repeated. If at step 226 the projected on-hand balance is determined to be less than the safety stock, then a planned replenishment shipment is calculated at step 227. There, the quantity of the planned shipment is calculated based on the preferred shipping quantity, desired number of days of supply, dates when the store can receive deliveries, and other ordering parameters. The planned shipment dates (ship date and receipt) are then calculated in step 228. Next, the newly calculated planned replenishment shipment is compared to the existing planned shipment from database 36 in step 229. If they are not the same, database 36 is updated in step 230. Finally, or if at step 229 no difference is determined to exist, the planned replenishment shipment is added to the projected on-hand balance in step 231 and the process continues.

Safety Stock

Another feature of replenishment system 200 is the calculation of time-phased safety stock levels based on the current and future arrangement of products on the shelves of retail stores 23. As explained above, planned replenishment orders which are calculated without accounting for the future changes in shelf configuration will be inaccurate. Consequently, they have limited use in planning for products at suppliers 24 (the second level in the supply chain, a retail distribution center for example), and planning projected inventory levels at retail stores 23 and suppliers 24.

The current and future shelf configurations are stored in database 36. This is done in such a way that shelf-planning systems (or planograms) can be easily interfaced with other aspects of system 20, e.g., replenishment system 200. Database 36 preferably stores the following shelf configuration information: the number of facings (product facing the consumer), the minimum number of rows deep required to create an attractive display, the maximum number of rows deep which will fit in the space allocated to this product, the amount of backroom safety stock (safety stock maintained in a location other than the store shelf), and the date this configuration becomes effective. For example, a product may have three facings, and should have a minimum of one row deep (or three products) to create an attractive display. The maximum number of rows is six, since no more than eighteen products will fit in the space allocated to this product. No additional units should be kept as safety stock in addition to the quantity on the shelf. Another example would be a mattress, where one mattress is kept on the display floor, and another is kept in the back. There is not enough room to store two mattresses on the display floor, but it is important to have two mattresses in stock. If a mattress were not stocked in the back, and someone were to buy the mattress on display, there would be nothing to display until the next shipment from the suppliers or supplier.

Figure 11:
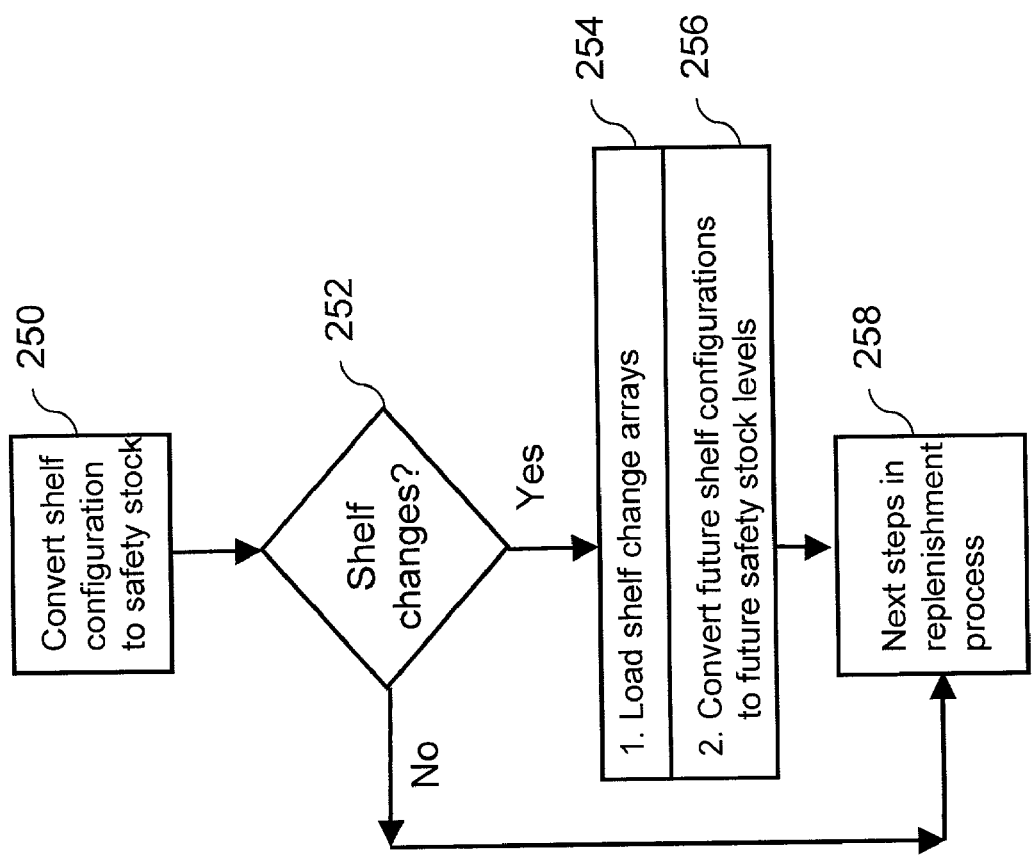
FIG. 11 is a flow diagram illustrating the logic used for converting shelf configuration into safety stock level.

FIG. 11 illustrates the logic in replenishment system 200 for converting shelf configuration into safety stock level. Initially, at step 250, the current shelf configuration is converted into a safety stock level by multiplying the facings by the minimum rows deep needed for an attractive display. Next, at step 252, a determination is made if shelf changes are needed. If there are any future shelf changes, the logic proceeds to step 254 where shelf change arrays are loaded. Next at step 256, these arrays are converted into future safety stock levels, and this second array is later tested as part of the process to determine when to schedule a planned replenishment shipment. After this step, or if there are no future shelf changes step 252, the logic proceeds to step 258. There, the next steps in the replenishment planning process can be executed as discussed below and illustrated in FIG. 12.

Figure 12:
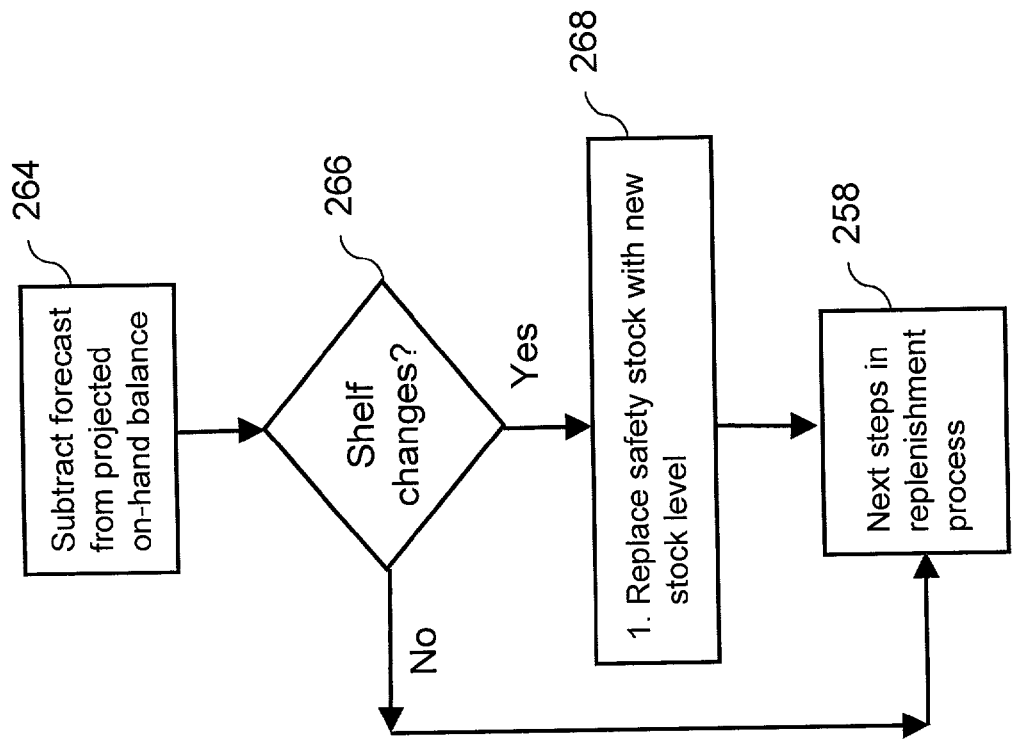
FIG. 12 is a flow diagram illustrating the logic used for updating the safety stock using future safety stock levels.

FIG. 12 illustrates the logic in replenishment system 200 for using future safety stock levels determined at step 256 to update the safety stock. FIG. 12 expands on steps 225 and 226 shown in FIG. 10a and discussed above. First, as depicted at step 264, each sales forecast for a product is subtracted from the projected on-hand balance for the product to give the new projected on-hand balance. The sales forecast was loaded from database 36 into transient memory 34 in steps 220 and 222, as shown in FIG. 10a and discussed above.

Next, at step 266, a determination is made if there is a shelf change in the future safety stock level from step 256 with a date prior to the forecast which was just subtracted. If so, then the current safety stock is replaced with the safety stock from the future shelf change, as indicated at step 268. After this step, or if there is no such shelf change, then the next steps in the replenishment process are carried out, as depicted by step 258. These steps begin with step 226 shown in FIG. 10a.

Financial Planning

Referring to FIG. 2, another feature of system 20 is its financial planning system 400. Financial planning system 400 is typically used by financial planners to more accurately estimate what is likely to happen in the future, and compare this projection to various budgets and other financial data. Financial planning system 400 multiples the projected sales forecasts by the selling price of the products and the cost of the products. This results in a projected financial plan showing the projected sales dollars, the projected cost of goods for those sales, and consequently the projected gross margins. Financial planning system 400 also multiplies the projected replenishment shipments by the cost of the products. This results in a projection of purchases, useful in cash flow planning. Using projected sales forecasts, financial planning system 400 calculates a projected inventory. This is also multiplied by the cost of the products, resulting in a projected inventory investment in dollars, also useful in cash planning.

Transportation and Capacity Planning

Replenishment system 200 maintains transportation and capacity planning information more efficiently than prior art retail supply chain distribution systems. Separate systems are typically used in the prior art for planning in each of the areas of replenishment, transportation and capacity. Replenishment system 200, by contrast, calculates, maintains and stores transportation and capacity planning information along with other data on planned replenishment shipments in a single location, i.e., database 36. In this approach, the weight, cube, picking hours, receiving hours, packaging, repacking, sorting and cleaning describe the planned replenishment shipment in addition to the quantity of the shipment, the projected ship date, the projected receipt date, and so on. If desired, replenishment system 200 may include one or both of the capacity planning and transportation planning functionality.

The advantage in this method is that it provides the bulk of the computer processing for capacity planning and transportation planning at little additional cost, since the planned replenishment shipments must be calculated as part of replenishment planning. If, as part of replenishment planning, the transportation planning and capacity planning numbers are also updated, the incremental computer processing is very small compared to a system where replenishment planning is done in one system and transportation planning and/or capacity planning are done in other systems. This is because one of the most expensive operations in this type of system is accessing and updating the database. If the system accesses and updates the database once for replenishment, transportation, and capacity planning, this is less costly in terms of computer processing than accessing and updating the database once for replenishment planning, again for transportation planning, and yet again for capacity planning.

One implementation of this aspect of the invention would be to include the capacity planning and transportation planning information in the table of planned replenishment shipments in database 36 which is a single relational database management system. Another implementation would be to include the capacity planning and transportation planning information in the same object in a single object-oriented database management system. The present invention encompasses implementations in other types of databases as well. While information used for capacity and transportation planning may be obtained from other sources, including other databases, the results of the capacity and transportation planning are stored in the same database as the planned replenishment shipments.

Under certain circumstances there are additional transportation or capacity requirements beyond weight, cube, picking hours, and receiving hours, e.g., set up or cleaning of products. These additional requirements may be stored separately, or in the same location as the other transportation or capacity requirements. This allows for situations where more resources need to be planned (in addition to weight, cube, picking hours, and receiving hours) for a product without incurring the processing to read the planned replenishment shipments from the database for every product in every location. Only the products with these additional resources need to be subjected to this processing either by virtue of their separate location or through tagging or otherwise identifying the products as having additional resources associated therewith. Since most retailers have few, and sometimes no, additional resources that need to be planned, this approach provides the necessary capabilities but without incurring the significant costs associated with reading the planned replenishment shipments from database 36 for all products at all locations. An advantage of integrating capacity and transportation planning with replenishment shipment planning, as described above, is that both capacity and/or transportation planning and replenishment shipment planning can be completed within the time period benchmarks described below for batch processing runs.

Batch and Continuous Planning

System 20 may be operated in batch mode or continuous mode. In batch mode, transactions happen and are processed and then the forecasting and replenishment shipment planning processes discussed above are executed. For example, a point-of-sale transaction would reduce the on-hand balance for a product which, because a transaction occurred relative to such product, would be replanned in the next batch run. Typically, replanning occurs in batch mode only for those products that underwent a transaction since the last batch processing. While batch mode processing is typically conducted once a day, it may be conducted more frequently or less frequently.

Alternatively, system 20 may be operated in continuous mode. As transactions for a product happen and are processed, the forecasting and replenishment shipment planning processes discussed above for each transaction are executed, and if appropriate, the product is immediately re-forecast or re-planned. For example, following a point-of-sale transaction system 20 will reduce the on-hand balance as discussed above, and also immediately recalculate the planned replenishment shipments for the product. Or, following a database maintenance transaction to override the forecast, system 20 will update the database and also immediately recalculate the projected sales. Similar updating is provided upon the occurrence of other transactions that would invalidate the projected sales. Also, projected replenishment shipments are re-planned upon the occurrence of transactions that would invalidate the planned replenishment shipment.

One advantage of continuous processing is that the forecast and planned replenishment shipment projections in system 20 are up-to-date throughout the day and reflect the situation as it exists now, rather than as of the end of the last batch. Another advantage of continuous processing is less computer hardware is needed to process a given number of products on the system. Many retailers have a relatively short "window" or amount of time in which to process the day's transactions and make the new projections available to the warehouse management system and suppliers. For example, a retailer may have a four-hour "window" based on the fact that the POS (Point-Of-Sale) data may not be available until 1 a.m. and the picking lists for shipments must be available at 5 a.m. on the same day. Therefore, if 2 million transactions and the associated re-forecasting and re-planning must be completed in four hours, the retailer will need a larger and/or more powerful computer or set of computers than would be the case if the 2 million transactions and associated re-forecasting and re-planning could be completed over a time period of 24 hours.

Low Volume Products

Figure 13:
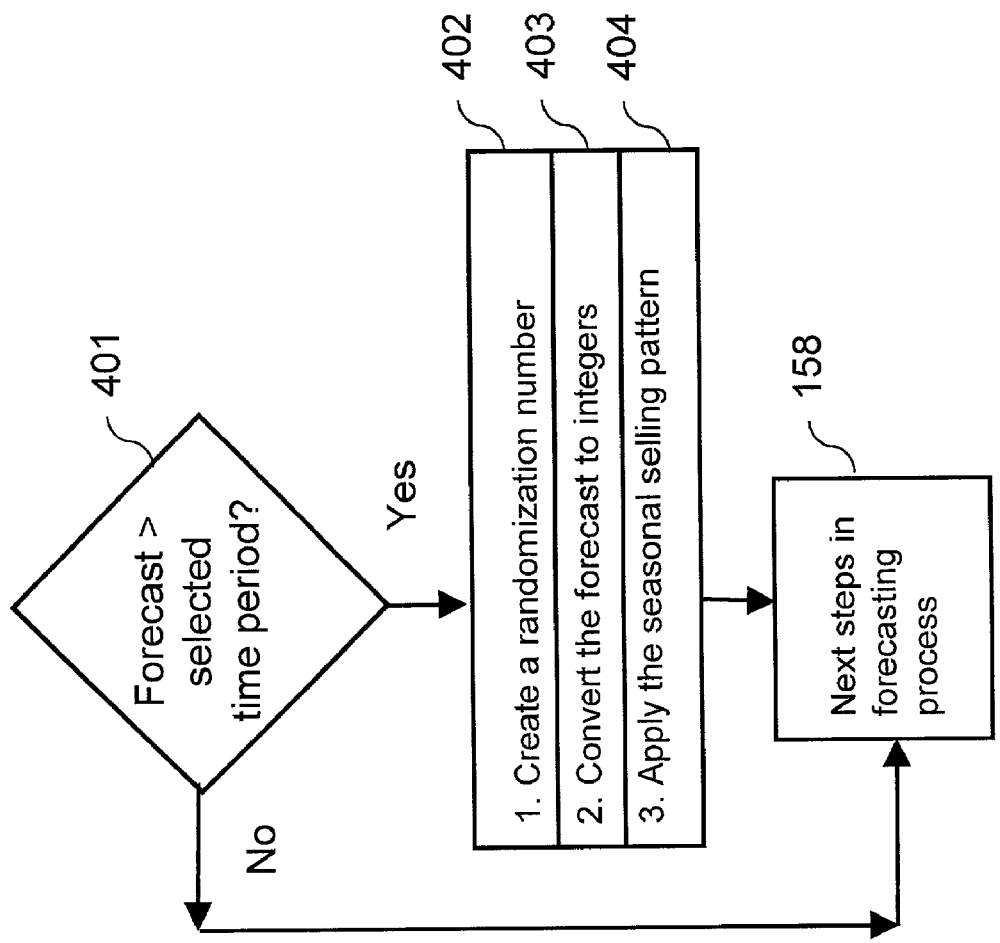
FIG. 13 is a flow diagram illustrating the logic used for low-volume products.

Referring to FIGS. 2 and 13, another feature of replenishment system 200 is specialized logic for determining time-phased forecasting and planned replenishment shipments for low-volume products. The objective of this logic is to reasonably distribute such planned replenishment shipments in a manner that is similar to what is likely to actually happen. Such distribution provides a valid simulation of reality, which is then used to plan for products at the supplier (either distribution center, wholesaler, or manufacturer), to plan for transportation (weight and cube), to plan for capacity (hours needed to receive the products and hours needed to pick and ship the products), and to do financial planning (projections of sales, purchases or replenishment shipments, inventory levels, gross margins, and so on).

FIG. 13 depicts specialized logic used to forecast low volume products. At step 401 each product is checked to determine whether or not the product is a low-volume product and therefore should use this specialized logic. If the forecasting for a given product is being done in time periods that are greater than or equal to a forecast time period that is indicative of a low-volume product, then this specialized low-volume forecasting logic is used. This forecast time period is typically in the range of one to three months, although periods of greater and lesser length may also be selected.

An important concept in this specialized logic is to distribute shipments of low-volume products over the forecast time period so as to simulate actual demand for a product. One approach for achieving such distribution is through the use of probability and seasonality of the product. More particularly, planned replenishment shipments for each product may be determined based on a combination of a random number for the product and the selling profile for the product over the course of the year.

At step 402 a random number is created for each product (if this number does not already exist from a prior processing run) using random number generation techniques well known to those skilled in the art. Generally, the number of random numbers selected is identical to the number of products that are determined to be sold in low volumes, e.g., 100 random numbers are selected when there are 100 low-volume products. Alternatively, it may be acceptable to select fewer random numbers than the number of low-volume products that exist, and use each random number for several products. For example, 25 random numbers could be selected for 100 low-volume products, with each random number being associated with four products. Also, when multiple units of a given product are forecast to be sold in a given forecast period, a random number is selected for each product. For example, if 2.5 products are forecast to be sold during a forecast period, the same random number is typically used to assign a specific date to all the forecasts for this product. An alternative solution is to assign a different random number to each forecast time period (such as 90 days), or to assign a different random number to each integer representation of a forecast (i.e., two random numbers for a forecast of 2 over a 90 day time period). Typically, the random numbers range between zero and one. However, in some cases satisfactory results may be obtained using random numbers falling in other ranges, although additional calculations will generally be required when using such other ranges, as discussed below.

Next, as indicated by step 403, a time period offset is determined for each product. When the random numbers fall in the range $0 \leq x \leq 1$, the time period offset is determined by multiplying the random number times one (the number of units of the product) times the number of days in the predetermined time period. Thus, if the random number for a given product is 0.5 and the time period is 90 days, then the offset is 0.5×1×90 days=45 days (before making any adjustments for the selling pattern of the product over the course of a year).

If a group of 50 low-volume products were each given random numbers, and assuming these random numbers were evenly distributed between zero and one, applying these random numbers to the forecast date determined by forecasting system 100 would yield an even distribution of forecast representations over the forecast time period. To illustrate this distribution, consider the products with small numbers assigned to them such as 0.01. The random number multiplied by the number of days in the forecast period gives the offset from the start date of the forecast. So, in this case where the random number is 0.01, and the forecast time period is 90 days, the calculated offset is 0.9 which when rounded to an integer gives 1 day. With an offset of one day, this particular forecast would be represented in the system on January 2; one day from the start date of January 1. Next consider the case where the random number assigned to a product is 0.99. This particular forecast would be represented in the system at a date near the end of the forecast time period: either on or near March 31. Similarly, all the other products in this group of 50 products would have random numbers assigned to them, and these numbers would be used to represent the forecast on a particular date. Taken in total, the sum of these forecasts for low-volume products would result in a total of 50 units spread nearly evenly over the dates from January 1 to March 31.

If it is desired to distribute shipments within the forecast period using random numbers that fall outside the range $0 \leq x \leq 1$, e.g., in the range $1 \leq x \leq 10$, then after the number is multiplied by the number of days in the predetermined period the result must be normalized. Such normalization should be performed so that the offsets determined for all the low-volume products are substantially uniformly distributed over the number of days in the predetermined time period.

For a product with a flat selling pattern over the course of a year, use of the random number distribution technique discussed above represents a reasonable simulation of reality. While any given product will probably sell on a different day than the representation of the forecast (January 2, for example), the sum of the sales for the group of products achieves such reasonable simulation of reality. So, for the example discussed above, fifty of these low-volume products will probably sell during the period from January 1 through March 31. While the sales are not likely to be the same each day, the pattern will be reasonable for a product that sells at a fairly even rate throughout the forecast period.

However, most products do not have a flat selling profile or pattern over the course of a year. Instead, they sell more during one time of the year than another. Garbage bags would be an example of this phenomenon. In certain climates garbage bags sell in greater volumes during the spring (cleanup) and the fall (bagging leaves).

Therefore, this seasonal profile or pattern may optionally be applied to more accurately represent the placement of these integer representations of the forecast, and hence replenishment shipments (assuming no excess inventory exists at the retail store), on a particular date. This is done in step 404. The effect of the profile is to put more of the integer representations in particular weeks than in other weeks.

The seasonal profile is accomplished using the selling profile. The selling profile is typically in the form of weekly percentages which represent the percentage of the annual total sales for a product that are expected to occur per week (such as 2% for a particular week, 5% in another week, and so on), although other representations of selling patterns could be used.

System 20 puts more or less integer representations of forecasts in a particular week through the use of an adjustment for the first forecast representation and an accumulator for the subsequent forecast representations, although other mechanisms could also be used. The adjustment works by accumulating the weekly percentages for the forecast period. For example, in a situation where a product sells at a nearly uniform rate throughout the year, the weekly percentages would be somewhat less than 2% per week (100%/52). Therefore, for a forecast period of 90 days for example, the sum of these percentages might be 25%. The adjustment calculation then applies the random number to the accumulated total. For example, if the sum of the weekly percentages for a given product in the forecast period is 25%, and the random number for the product is 0.5, then the calculation yields 12.5%. This calculated number is used to determine where to place the integer representation of the forecast. The logic starts at the beginning of the forecast time period, and begins to accumulate the weekly percentages. When the sum of these percentages equals or exceeds the calculated number (12.5% in the example above), the date of that week becomes the date of the integer representation of the forecast. In understanding the intent of this logic, it is helpful to consider three situations.

In the first situation, the weekly percentages in the early part of the forecast time period are zero. Therefore, when the weekly percentages are accumulated, they will not exceed the calculated number (12.5% in the example above), and therefore no integer forecast representations will be placed in these early weeks. This is appropriate since the zero percentages indicate the probability of selling the product during these weeks is very small.

In the second situation, the weekly percentages in the early part of the forecast time period are fairly large, say 5% or 10% per week. Therefore, when the weekly percentages are accumulated, they will exceed the calculated number (12.5% in the example above) within the first few weeks. Again, this is appropriate since the larger weekly percentages indicate the probability of selling the product during these weeks is high.

In the third situation, the weekly percentages throughout the forecast time period are the same (a little less than 2% per week). Therefore, when the weekly percentages are accumulated, they will exceed the calculated number (12.5% in the example above) halfway through the selling period. Again, this is appropriate since the randomization number in this example is 0.5 indicating that the integer representation of the forecast would be halfway through the forecast period (before adjusting for any differences in sales from one week to the next).

For subsequent integer forecast representations, an accumulator reconstructs the weekly forecasts from the selling profile, and these are accumulated until they reach the number one. For example, if a given week represents a forecast of 0.2, and the forecast for the next week represents 0.3, and the forecast for the third week represents 0.7, then the accumulator would be 0.2 in the first week, 0.5 in the second week (0.2+0.3), and 1.2 in the third week (0.2+0.5+0.7). Since the accumulator has exceeded the number one in the third week, the date of the third week is the date where the integer representation of the forecast is made. The integer of 1 is then subtracted from the accumulator, and the process can continue to represent additional integer forecast representations where the forecast quantity is greater than one. Other approaches can use statistical weighting to put more integer forecast representations in higher selling weeks than in lower selling weeks.

Using the group of 50 low-volume products mentioned above, the sum of the integer representations of the forecasts during the higher-selling weeks would be a greater number than the sum of the integer representations of the forecasts during the lower-selling weeks. As a result, more products are projected to be shipped during higher-selling weeks.

By applying the process discussed above and illustrated in steps 401-404, replenishment system 200 will create planned replenishment shipments at the date where the forecast is first represented as an integer rather than "bunching up" the planned replenishment shipments near the current date. This is because the date at which the forecast is represented is the date when the projected on-hand balance is reduced below the safety stock. For example, if a product has a safety stock of 2 and an on-hand balance of 2, the projected on-hand balance will drop below the safety stock on the date of the integer representation of the forecast. This is also the date when the planned replenishment shipment should be delivered to bring the projected on-hand balance up to (or above) the safety stock.

In the example above, one product would have a planned replenishment shipment on January 2. Another would have a planned replenishment shipment on March 31, and so on. The planned replenishment shipments for the group of 50 low-volume products, when totaled by date would create a pattern similar to the pattern described above for the forecast representations. Assuming no excess inventory at the stores, the sum of the planned replenishment shipments would be greater in the higher-selling weeks than the sum of the planned replenishment shipments during the lower-selling weeks. If excess inventory existed at some of the stores, then no planned replenishment shipments would be needed to these stores, and so the distribution of planned replenishment shipments over the days in the forecast period might not be the same as the representation of the forecasts as integers during the same time period.

For clarity of description, the example above illustrated the situation where the forecast was for a single unit of a given product during the forecast period. However, there is no restriction on the quantity of forecasted sales for a given product during a given forecast period. For example, a forecast quantity of 3 could exist for the time period between January 1 and March 31. In this case, the forecast would be represented as two or three integers with quantities of one on two or three dates throughout the forecast period from January 1 through March 31 using the accumulator logic explained above.

The example above included a single time period (90 days) and a single planning horizon into the future (90 days). The actual implementation of this aspect of the invention is not so restricted. Some products could have 90-day forecasts, other products 180-day forecasts, and so on. Additionally, the planning horizon might be one year, 40 weeks, 26 weeks, etc. In the case of a one-year planning horizon, four of the 90-day forecasts explained above would exist for the product in the example. The first might extend from January 1 to March 31, the second from April 1 to June 30, and so on. The example also has the forecasts starting and ending on the dates which correspond to the beginning and ending dates of a month. The actual implementation of this logic in the invention is not restricted in this way and the starting and ending dates for forecasts can be any date.

Use of the low-volume product logic also provides a more accurate simulation of reality for transportation planning information (weight and cube), whether or not included as an integral aspect of system 20. Rather than showing large weight and cube requirements in the first few days, followed by zero or near zero demands later in the time period, the pattern is more like what will actually happen, with greater weight and cube in the higher-selling weeks.

Additionally, the low-volume product logic provides similar benefits for capacity planning information (equipment and manpower), as well as the financial planning information (projected sales, projected shipments or purchases, projected inventory levels, projected storage space requirements, and so on). The result of using the randomization calculation in combination with the selling profile or pattern gives a more accurate projection of the future for these types of information.

User Interface

Figure 14:
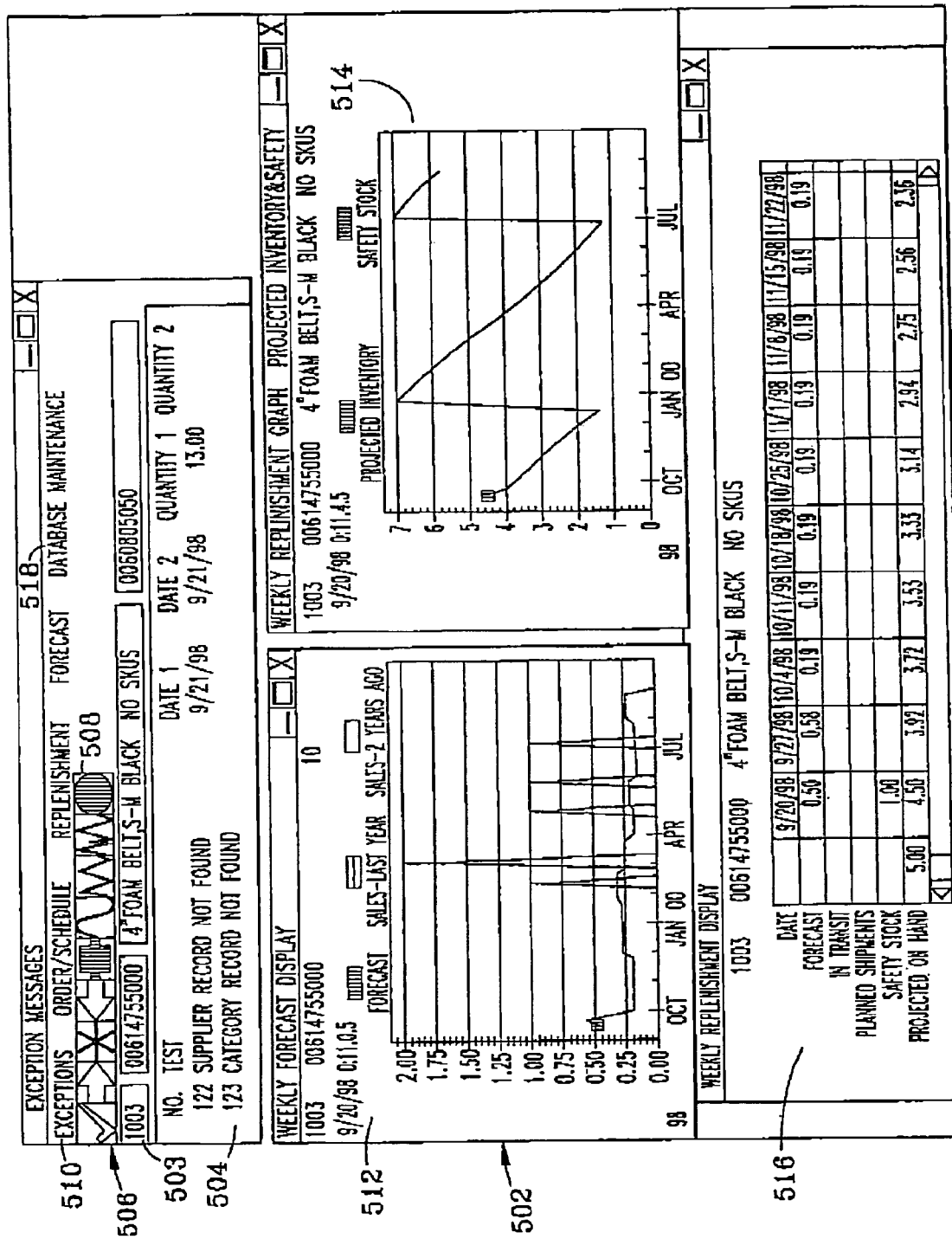
FIG. 14 illustrates a screen display of the system containing information for a retail store at the top level of the supply chain.

FIG. 14 illustrates the primary user display 502 for a product at the level of retail store 23. Display 502 is designed to allow an analyst to quickly visualize the situation on a product or group of products identified at 503. Top section 504 of display 502 shows all exception messages for this product or group of products.

Primary user display 502 is designed to permit the analyst to obtain additional information quickly and easily. Icons 506 on tool bar 508 provide a number of different graphs and spreadsheet displays, as does drop-down menu 510. The example in FIG. 14 shows a weekly forecast graph 512, a weekly replenishment graph 514, and a weekly replenishment spreadsheet 516. The weekly forecast graph shows sales from prior years, as well as the forecast. The analyst can zoom in on the graph 512 to display more detail where necessary. The weekly replenishment graph 514 shows the projected inventory level illustrating the "sawtooth" curve showing the impact on inventory where shipments are projected to be received increasing the inventory and where sales gradually reduce the inventory level to near the safety stock level. The weekly replenishment spreadsheet 516 shows the same information in a spreadsheet format. Rows on the spreadsheet show the forecast, any quantities in-transit to retail store 23 from supplier, projected replenishment shipments, the safety stock level, and the projected on-hand balance.

The analyst can maintain database 36 without leaving this display. The database maintenance drop-down menu 518 allows access to the different database tables. This would be used, for example, to correct the missing or incorrect category record. In this case, an exception message exists for a category record not found.

Figure 15:
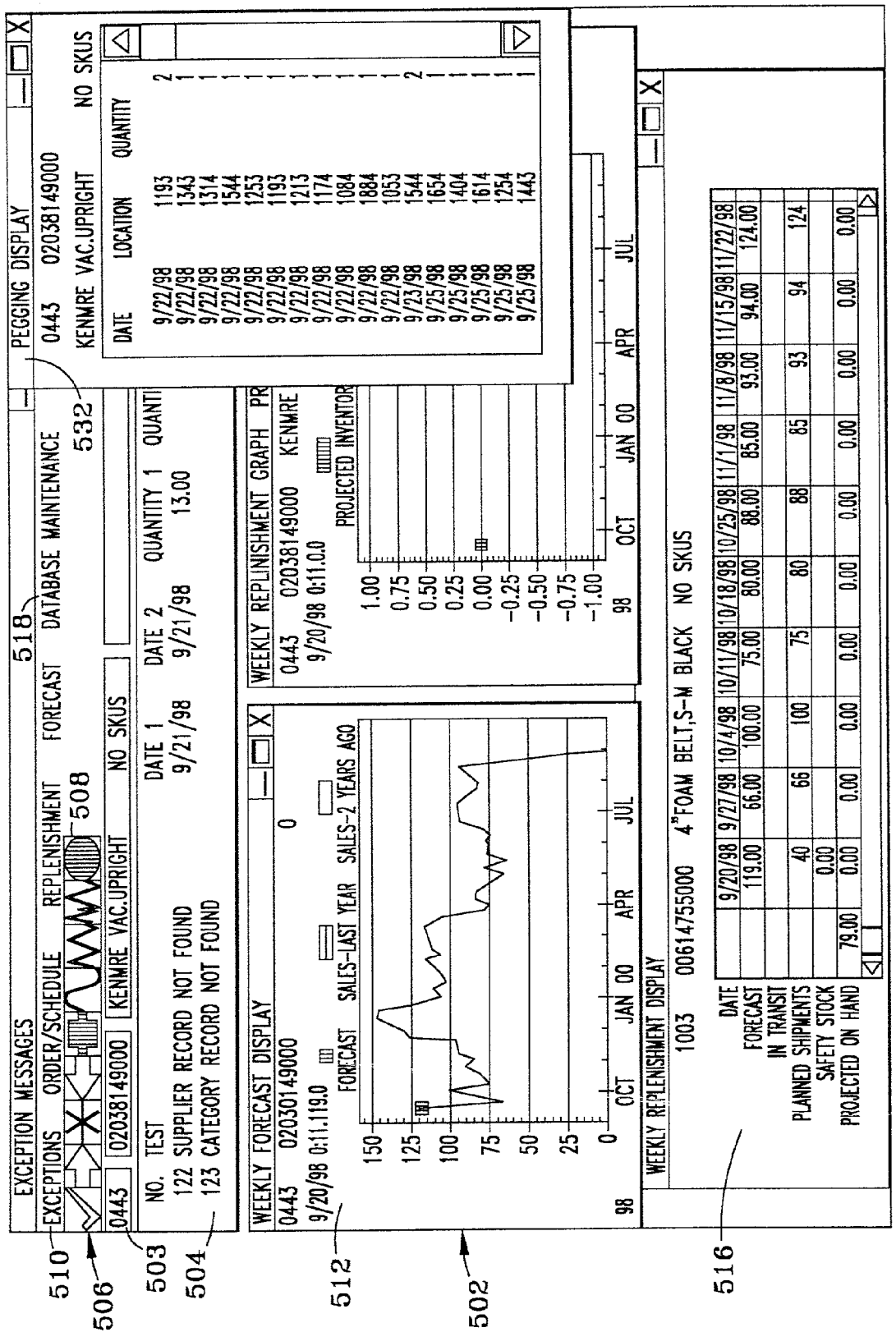
FIG. 15 is similar to FIG. 14, except that it pertains to a supplier at the second level of the supply chain.

FIG. 15 illustrates the primary user 502 display for a product or group of products at the supplier 24. In this situation, the forecast graph shows the sum of the projected replenishment shipments to the stores. In the upper right of FIG. 15, a spreadsheet 532 shows what is called the dependent demand information. This provides a listing by date of the stores creating demand on supplier 24. For example, on Sep. 22, 1998, eleven stores are creating a total demand of twelve on suppliers 24 for this product.

System 20 is sufficiently flexible in its design to permit implementation in various computer systems and networks, as described above. Referring to FIGS. 3 and 4, large corporate users will typically implement system 20 using either the client-server network described above and illustrated in FIG. 3, or a browser-based system as shown in FIG. 4, where network 54 is an intranet network. This permits product forecasting and replenishment ordering to be performed by a centralized business group, thereby obtaining the benefits of large-volume orders, ready use of standard business processes, and other benefits.

Alternatively, system 20 is adapted for use with small retail stores 23, such as general stores, convenience stores not affiliated with a national chain or franchise, and other independent stores or groups of stores. In many cases, such retail stores 23 lack access to sophisticated forecasting and replenishment planning tools. Also, such retail stores 23 cannot afford to employ a trained analyst to run such tools, given that only a few minutes of an analyst's time would be required in any given day to run the tools. Further, small retail stores 23 may lack connections to vendors and volume purchasing power that large businesses enjoy.

To address these problems that small and/or independent retail stores 23 face, system 20 may be implemented such that program 26 provides the central application program for a Web-based forecasting and replenishment planning and ordering service. Referring to FIG. 4, when system 20 is implemented to provide such service, network 54 is the Internet or other wide area wired or wireless network, including combination wired and wireless networks. User computers 56 are PCs or other computing devices having a browser for navigating in network 54, and computer 28 is a computer (or computers) used by the service organization providing the forecasting and replenishment planning and ordering services. For example, user computer 56a may be a PC used by a general store in Vermont, user computer 56b may be a personal digital assistant or other Internet appliance used by a gas station convenience store in Mississippi and user computer 56c may be a wireless set-top box used by large independent bookstore in California. All of these user computers 56 are connected via network 54 to the service provider's computer 28.

Turning now to FIGS. 3-5, at the end of each business day, sales information is downloaded from point of sale system 90 on user computer 56 at retail store 23 via network 54 to the service provider's computer 28. System 20 at the service provider then performs the forecasting, replenishment planning and replenishment ordering, described above, for retail store 23. This service can be provided using analysts trained on system 20, given the overall volume of products and locations being planned. Because the service provider is typically providing such services for a large number of retail stores 23, it can transmit the projected schedule of planned replenishment shipments to the various manufacturers 25 (the third level in the supply chain in many instances, such as a manufacturer's distribution center). This reasonably accurate projection of future purchases by the next higher level in the supply chain, e.g., supplier 24 at level 2 (perhaps a retail distribution center in this example) allows manufacturer 25 to provide higher levels of customer service with less inventory and higher productivity because there are fewer "surprises." As a result, manufacturer 25 typically provides discounts in exchange for this information. This is in addition to the significant advantages provided by system 20 itself, as discussed above. As a consequence, small, independent retail stores 23 are able to have access to the same systems and system benefits as large chain stores and franchises.

Most of the processing for system 20 is done in large batch processing runs, typically in the middle of the night, although the system can also be run in a continuous mode. This includes updating the on-hand balance through the perpetual inventory system 92, recalculating forecasts in the forecasting system 100, and recalculating planned replenishment shipments in the replenishment system 200. In the course of this processing, the processes described above are used to meet the needs of retail organizations. An important advantage of the present time-phased planning system 20 is that forecasting of projected sales and determination of projected replenishment shipments for a very large number of products (100-400 million product/location combinations) may be achieved using a computer 28 (FIG. 2) that is relatively inexpensive and is of relatively limited computing capacity. For example, benchmarking of system 20 was performed using a single server manufactured by Dell Computer Corporation having two 500 MegaHertz microprocessors sold by Intel Corporation under the trademark PENTIUM and having the X86 instruction set used in such microprocessors sold in the year 2000, and 1 Gigabytes of transient memory. The benchmarking revealed that system 20 is capable of forecasting projected sales one year into the future for 50,000 products, each having an associated location, e.g., retail store 23, where net changes occurred for 15,000 product/location combinations using 715,000 associated sales history records, and generating the appropriate exception messages, in about 10 minutes, assuming an average of 50-60% utilization of the microprocessors over the entire forecasting process. As used herein, including in the claims, "net change" means recalculation of a forecast or planned replenishment shipment with respect to a given product/location combination when something has occurred to render the prior forecast or planned replenishment shipment invalid. In addition, the benchmarking revealed such computer can recalculate the planned replenishment shipments one year into the future for such product/location combinations using the sales forecasts referenced above and generate the appropriate exception messages in about 10 minutes, assuming an average of 50-60% utilization of the microprocessors over the entire replenishment planning process. Given the relatively limited periods of time generally available to perform the processes described above, system 20 provides a highly cost efficient approach to forecasting and replenishment planning and ordering in a retail store supply chain.

New forecasts are typically generated in any given day for only some of the products stored in database 36. However, the forecast that forecasting system provides for any given day covers all products stored in database 36, not just those where a net change occurred. For products with respect to which a net change did not occur, the last-generated forecast is used. It is also to be appreciated that replenishment system 200 does typically perform replenishment planning with respect to just the set of products that underwent a net change in connection with generation of the forecast used by the replenishment system. Any products in the total set of products in database 36 may, however, undergo replenishment planning, although typically not all such products. For example, using the product quantities specified in the benchmarking study above, replenishment system 200 typically does not perform replenishment planning with respect to all 15,000 product/location combinations undergoing a net change during forecasting. However, the product/location combinations subjected to replenishment planning are drawn from the 50,000 product/location combinations available.

While the present invention has been described in connection with a preferred embodiment, it will be understood that it is not so limited. On the contrary, it is intended to cover all alternatives, modifications and equivalents as may be included within the spirit and scope of the invention as defined in the appended claims.

What is claimed is:

1. A computer-implemented forecasting system for determining time-phased sales forecasts and planned replenishment shipments for products that sell in low volumes in a retail store supply chain, the system comprising:
 a computing resource having a processor, a memory and a program stored in said memory, wherein said processor executes said program, said program including:
  i) a first portion that determines projected sales of a plurality of low-volume products for a retail store in the supply chain during a first time period using numerical representations of seasonal selling profiles for each of said plurality of low-volume products during said first time period, wherein said projected sales are determined with respect to each of said plurality of said low-volume products by evaluating when a mathematical product obtained by multiplying a random number times a summation of said numerical representations of seasonal selling profiles for said each low-volume product for a plurality of second time periods exceeds a threshold, wherein said threshold for each of said plurality of low-volume products equals said random number times a summation of said numerical representations for said first time period for said each low-volume product, further wherein said first portion uses said random number to determine an offset from a day in said first time period for each of said low-volume products; and ii) a second portion that, using said projected sales determined by said first portion, distributes within said first time period replenishment shipment dates for each of said plurality of low-volume products, wherein said offset is used by said second portion to define said replenishment shipment dates.

2. A system according to claim 1, wherein said first portion generates a random number for each of said plurality of low-volume products.

3. A system according to claim 2, wherein said first portion uses said random number to determine an offset from the first day of said first time period for each of said low-volume products, wherein said offset is used by said second portion to define said replenishment shipment dates.

4. A system according to claim 1, wherein said second portion determines different shipment dates within said first time period for low-volume products having more than one projected sale during said first time period.

5. A system according to claim 1, wherein said second portion adjusts said shipment dates for at least some of said plurality of low-volume products when excess inventory of said at least some of said plurality of low-volume products exists at said retail store.

6. A system according to claim 1, wherein said first portion determines projected sales for a plurality of low-volume products for a plurality of retail stores in the supply chain during said first time period.

7. A system according to claim 1, wherein said second portion determines an aggregate demand for said plurality of low-volume products to be shipped on said replenishment shipment dates for use by entities that supply retail stores in the supply chain in place of forecasts.

8. A system according to claim 1, wherein said first portion indicates that a projected sale of each of said plurality of low-volume products occurs in that one of said plurality of second time periods in which, for said each low-volume product, said mathematical product exceeds said threshold.

9. A system according to claim 1, wherein each of said numerical representations is a percentage of total sales over a third time period for a corresponding one of said plurality of low-volume products that is projected to fall in one of said plurality of second time periods.

10. A system according to claim 9, wherein said second time period is a week and said third time period is a year.

11. A system according to claim 1, wherein said threshold for each of said plurality of low-volume products equals said random number times a summation of said numerical representations for said first time period for said each low-volume product.

12. A system according to claim 1, wherein said threshold is the integer 1.

13. A system according to claim 1, wherein said threshold is one of the following: a fraction and an integer.

14. A method of determining time-phased sales forecasts and planned replenishment shipments for products that sell in low volumes in a retail store supply chain using a computing resource having a processor, a memory and a program stored in the memory, wherein the processor executes said program, the method comprising the steps of:

a) using the computing resource to determine projected sales of a plurality of low-volume products for a retail store in the supply chain during a first time period by evaluating for each of said plurality of low-volume products when a mathematical product obtained by multiplying a random number times a summation of numerical representations of seasonal selling profiles for said each low-volume product for a plurality of second time periods exceeds a threshold, wherein said threshold for each of said plurality of low-volume products equals said random number times a summation of said numerical representations for said first time period for said each low-volume product, and further using said random number to determine an offset from a day in said first time period for each of said low-volume products; and b) using the computing resource to distribute within said first time period shipment dates for each of said plurality of low-volume products based on said projected sales, and further using said offset to define said shipment dates.

15. A method according to claim 14, wherein said step b includes the step of adjusting said shipment dates for at least some of said plurality of low-volume products when excess inventory of said at least some of said plurality of low-volume products exists at said retail store.

16. A method according to claim 14, further including determining an aggregate demand for said plurality of low-volume products to be shipped on said shipment dates for use by entities in the supply chain that supply retail stores retail stores in place of forecasts.

17. A system according to claim 14, wherein said determining step includes indicating that a projected sale of each of said plurality of low-volume products occurs in that one of said plurality of second time periods in which, for said each low-volume product, said mathematical product exceeds said threshold.

18. A system according to claim 14, wherein each of said numerical representations used in said determining step is a percentage of total sales over a third time period for a corresponding one of said plurality of low-volume products that is projected to fall in one of said plurality of second time periods.

19. A system according to claim 18, wherein said second time period is a week and said third time period is a year.

20. A system according to claim 14, wherein said threshold for each of said plurality of low-volume products used in said determining step equals said random number times a summation of said numerical representations for said first time period for said each low-volume product.

21. A system according to claim 14, wherein said threshold is an integer.

22. A computer-implemented forecasting system for determining time-phased sales forecasts and planned replenishment shipments for products that sell in low volumes in a retail store supply chain, the system comprising:

a) forecasting means for determining projected sales of a plurality of low-volume products for a retail store in the supply chain during a first time period using numerical representation of seasonal selling profile for each of said plurality of low-volume products during said first time period, wherein said projected sales are determined with respect to each of said plurality of said low-volume products by evaluating when a mathematical product obtained by multiplying a random number times a summation of said numerical representations of seasonal selling profiles for said each low-volume product for a plurality of second time periods exceeds a threshold, wherein said threshold for each of said plurality, of low-volume products equals said random number times a summation of said numerical representations for said first time period for said each low-volume product, further wherein said forecasting means uses said random number to determine an offset from a day in said first time period for each of said low-volume products; and b) replenishment shipment means for distributing within said first time period, based on said projected sales, shipment dates for each of said plurality of low-volume products, wherein said offset is used by said replenishment shipment means to define said replenishment shipment dates.

23. A system according to claim 22, wherein said replenishment shipment means calculates an aggregate demand for said plurality of low-volume products to be shipped on said shipment dates for use by entities that supply retail stores in the supply chain.

24. A system according to claim 22, wherein each of said numerical representations is a portion of total sales over a third time period for a corresponding one of said plurality of low-volume products that is projected to fall in one of said plurality of second time periods.

25. A system according to claim 22, wherein said second time period is shorter than said third time period.

26. A system according to claim 22, wherein said threshold for each of said plurality of low-volume products equals said random number times a summation of said numerical representations for said first time period for said each low-volume product.

27. A system according to claim 22, wherein said threshold is an integer.

28. A computer-readable storage medium for storing a computer program executable on a computer, the program including instructions for performing the steps of:

a) determining projected sales of a plurality of low-volume products for a retail store in the supply chain during a first time period using seasonal selling profile for each of said plurality of low-volume products during said first time period by evaluating for each of said plurality of low-volume products when a mathematical product obtained by multiplying a random number times a summation of numerical representations of seasonal selling profiles for said each low-volume product for a plurality of second time periods exceeds a threshold, wherein said threshold for each of said plurality of low-volume products equals said random number times a summation of said numerical representations for said first time period for said each low-volume product, and further using said random number to determine an offset from a day in said first time period for each of said low-volume products; and b) distributing within said first time period shipment dates for each of said plurality of low-volume products using said projected sales, and further using said offset to define said shipment dates.

29. A medium according to claim 28, wherein said step b includes the step of adjusting said shipment dates for at least some of said plurality of low-volume products.

30. A computer-readable medium according to claim 28, wherein said distributing step includes determining an aggregate demand for said plurality of low-volume products to be shipped on said shipment dates for use by entities in the supply chain that supply retail stores.

31. A system according to claim 28 wherein said determining step includes indicating that a projected sale of each of said plurality of low-volume products occurs in that one of said plurality of second time periods in which, for said each low-volume product, said mathematical product exceeds said threshold.

32. A system according to claim 28 wherein each of said numerical representations used in said determining step is a percentage of total sales over a third time period for a corresponding one of said plurality of low-volume products that is projected to fall in one of said plurality of second time periods.

33. A system according to claim 28, wherein said threshold for each of said plurality of low-volume products equals said random number times a summation of said numerical representations for said first time period for said each low-volume product.

* * * * *

UNITED STATES PATENT AND TRADEMARK OFFICE
CERTIFICATE OF CORRECTION

PATENT NO. : 7,552,066 B1 Page 1 of 1
APPLICATION NO. : 09/899593
DATED : June 23, 2009
INVENTOR(S) : Landvater It is certified that error appears in the above-identified patent and that said Letters Patent is hereby corrected as shown below:

In column 22, claim 16, lines 39 and 40, delete the second occurrence of "retail stores".

Signed and Sealed this

Twenty-fourth Day of November, 2009

David J. Kappos
*Director of the United States Patent and Trademark Office*